(12) United States Patent
Uemura et al.

(10) Patent No.: US 10,744,791 B2
(45) Date of Patent: Aug. 18, 2020

(54) OPTICAL PRINT HEAD AND IMAGE FORMING DEVICE

(71) Applicant: Konica Minolta, Inc., Tokyo (JP)

(72) Inventors: Takaki Uemura, Seto (JP); Makoto Obayashi, Toyokawa (JP); Masayuki Iijima, Okazaki (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/291,830

(22) Filed: Mar. 4, 2019

(65) Prior Publication Data

US 2019/0275806 A1 Sep. 12, 2019

(30) Foreign Application Priority Data

Mar. 8, 2018 (JP) ................. 2018-041469

(51) Int. Cl.
*B41J 2/45* (2006.01)
*H04N 1/036* (2006.01)
*G03G 15/043* (2006.01)
*G03G 15/04* (2006.01)

(52) U.S. Cl.
CPC ........... *B41J 2/451* (2013.01); *G03G 15/043* (2013.01); *G03G 15/04054* (2013.01); *H04N 1/036* (2013.01)

(58) Field of Classification Search
CPC . B41J 2/451; G03G 15/04054; G03G 15/043; H04N 1/036; G02B 19/0061

USPC ................................ 347/238, 244
See application file for complete search history.

(56) References Cited

U.S. PATENT DOCUMENTS 9,974,135 B1* 5/2018 Nelson .............. G01J 1/32
2010/0196053 A1* 8/2010 Tanaka ........... G03G 15/326
399/220

FOREIGN PATENT DOCUMENTS

JP 2010-179617 A 8/2010

* cited by examiner

*Primary Examiner* — Huan H Tran
*Assistant Examiner* — Alexander D Shenderov
(74) *Attorney, Agent, or Firm* — Osha Liang LLP

(57) ABSTRACT

An optical print head that performs optical writing to a photoreceptor includes: a light transmissive substrate; a light emitting unit including light emitting element groups, each of which includes two or more light emitting elements disposed on a first main surface of the substrate; a lens array including lenses that correspond one-to-one to the light emitting element groups; light detection units disposed above the second main surface of the substrate in one-to-one correspondence to the light emitting element groups and that detects the light from each of the light emitting elements; and correction unit that corrects light amounts of the light emitting elements of the light emitting element group based on detection of the light detection units.

10 Claims, 15 Drawing Sheets

<A-A' cross-section>

<C-C' cross-section>

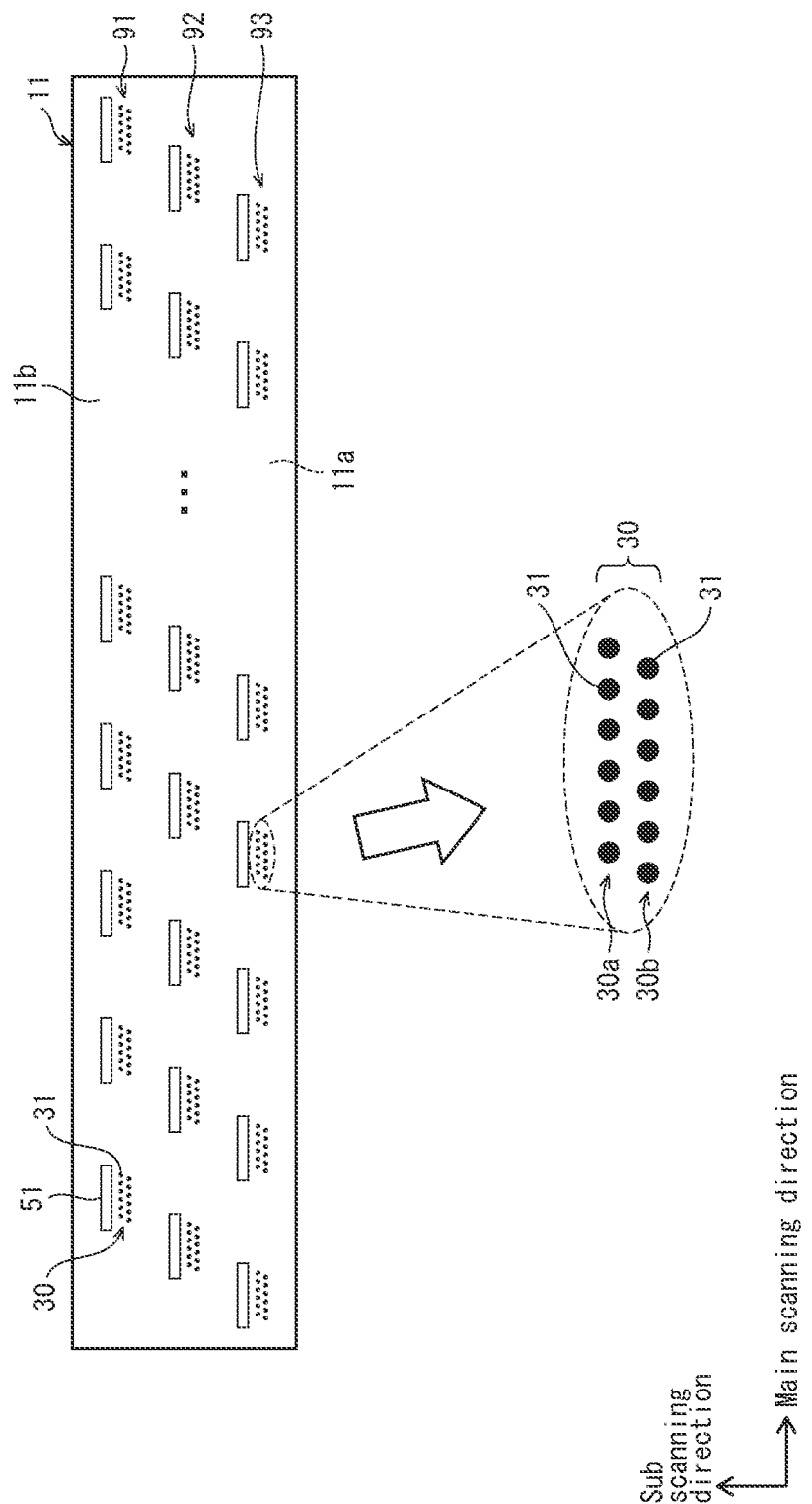

Cross-sectional diagram

Plan diagram (G1 lens member 61)

Plan diagram (aperture member 62)

FIG. 8

Table 132a

| Number of light emitting element n | Correction coefficient Cn |
|---|---|
| 1 | C1 |
| 2 | C2 |
|  | ⋮ |

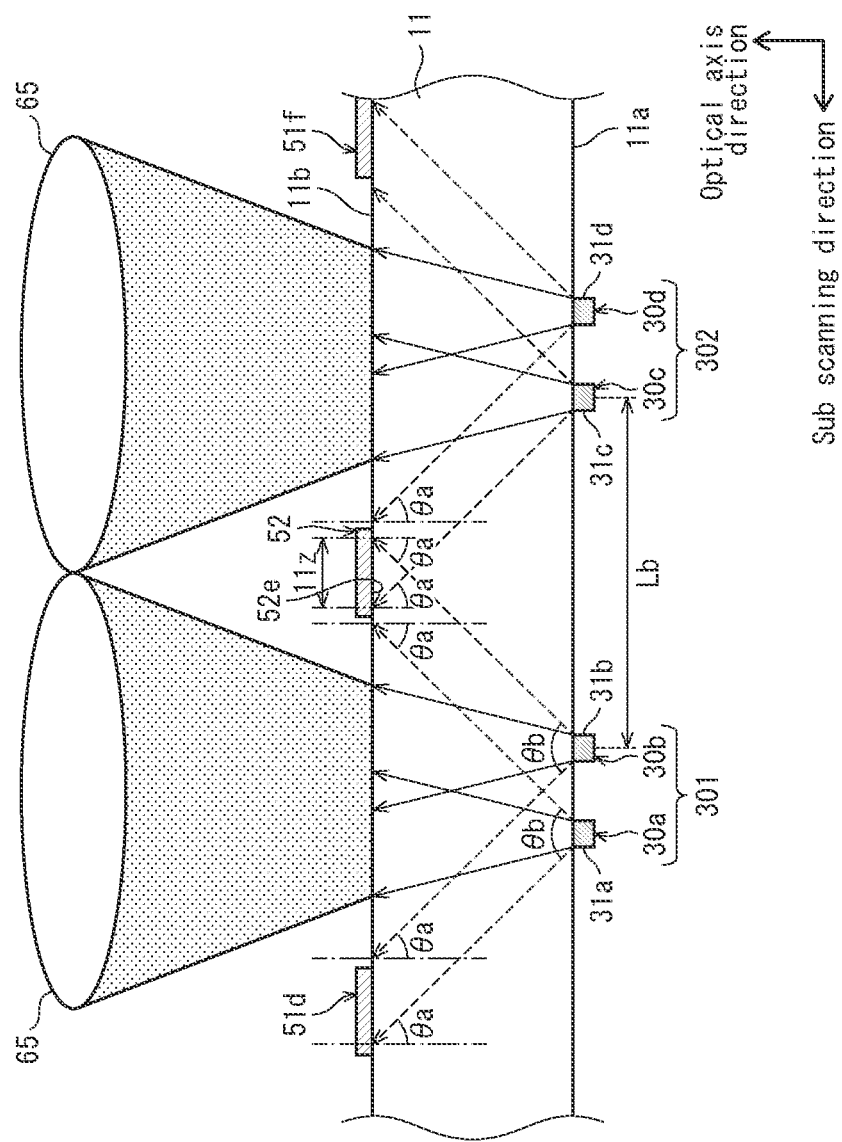

OPTICAL PRINT HEAD AND IMAGE FORMING DEVICE

CROSS-REFERENCE TO RELATED APPLICATIONS

This application claims priority to Japanese Patent Application No. 2018-041469 filed Mar. 8, 2018, the contents of which are hereby incorporated herein by reference in its entirety.

BACKGROUND

Technical Field

The present invention relates to optical print heads and image forming devices.

Description of the Related Art

In recent years, development of optical print heads in which organic light emitting diodes (OLEDs) or the like are used as light emitting elements arrayed on a light source substrate and light from the OLEDs is imaged onto a photoreceptor through a lens array as an imaging optical element is being promoted.

JP2010-179617 describes that, in a light exposure head in which multiple light emitting element groups each including a plurality of (e.g. six) light emitting elements are mounted two-dimensionally in a main scanning direction and a sub scanning direction on lower surface of a glass substrate, a lens array that includes microlenses corresponding one-to-one to the light emitting element groups is disposed and light emitted from the light emitting elements of each of the light emitting element groups, transmitted through the glass substrate, and emitted from an upper surface of the glass substrate is guided to a photoreceptor through the corresponding one of the microlenses.

JP2010-179617 further describes that an optical sensor for performing light amount correction of the light emitting elements is mounted on the upper surface of the glass substrate. When performing light amount correction (calibration), correction processing is performed sequentially for each of the light emitting elements one by one to individually detect, by the optical sensor, light radiated from the light emitting element, and to control, based on the detection results, an amount of electricity or the like conducted through the light emitting element such that the light emitting element emits a target light amount.

JP2010-179617 above has a structure in which an optical sensor is shared by light emitting element groups. For example, when the number of the light emitting element groups is M (integer equal to two or greater) and the number of the light emitting elements of a light emitting element group is N (integer equal to two or greater), (M×N) light emitting elements need to be sequentially caused to emit light one by one and the light amount needs to be detected by the optical sensor during calibration.

The greater the number of the light emitting elements and the number of the light emitting element groups, the longer a total time length from the start of correction processing for the first light emitting element to the end of correction processing for the last $((M \times N)^{th})$ light emitting element. This means that a long time period is required for calibration.

Unless calibration ends, optical writing operations by using a light exposure head after light amount correction cannot be started. Accordingly, increase of the time length required for calibration delays start of a job including an optical writing operation, such as a print job, and due to this, productivity of the job may consequently deteriorate.

SUMMARY

One or more embodiments of an optical writing head and an image forming device can shorten a time length required for light amount correction of the light emitting elements.

One or more embodiments of the present invention provide an optical print head performing optical writing to a photoreceptor, the optical print head including: a light transmissive substrate; a light emitting unit including light emitting element groups each including two or more light emitting elements disposed on a first main surface of the substrate; a lens array including lenses corresponding one-to-one to the light emitting element groups, the lenses each guiding, to the photoreceptor, a portion of light radiated from each of the light emitting elements of a corresponding one of the light emitting element groups, incident on the first main surface, transmitted through the substrate, and emitted from a second main surface of the substrate; light detection units disposed above the second main surface of the substrate in one-to-one correspondence to the light emitting element groups; and a correction unit performing a correction for each of the light emitting element groups. In the correction, light from each of the light emitting elements of the light emitting element group is detected by a corresponding one of the light detection units, and light amounts of the light emitting elements of the light emitting element group are corrected based on the detected light.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the invention. In the drawings:

FIG. 3 is a plan diagram of a glass substrate, seen from a light emitting surface side;

FIG. 8 is a diagram exemplifying a table in which correction coefficient information is stored;

FIG. 14 illustrates a structure according to one or more embodiments;

DETAILED DESCRIPTION

The following describes embodiments of an optical print head and an image forming device pertaining to the present invention, taking a tandem-type color printer (hereinafter simply referred to as "printer") as an example.

(1) Structure of Printer

Figure 1:
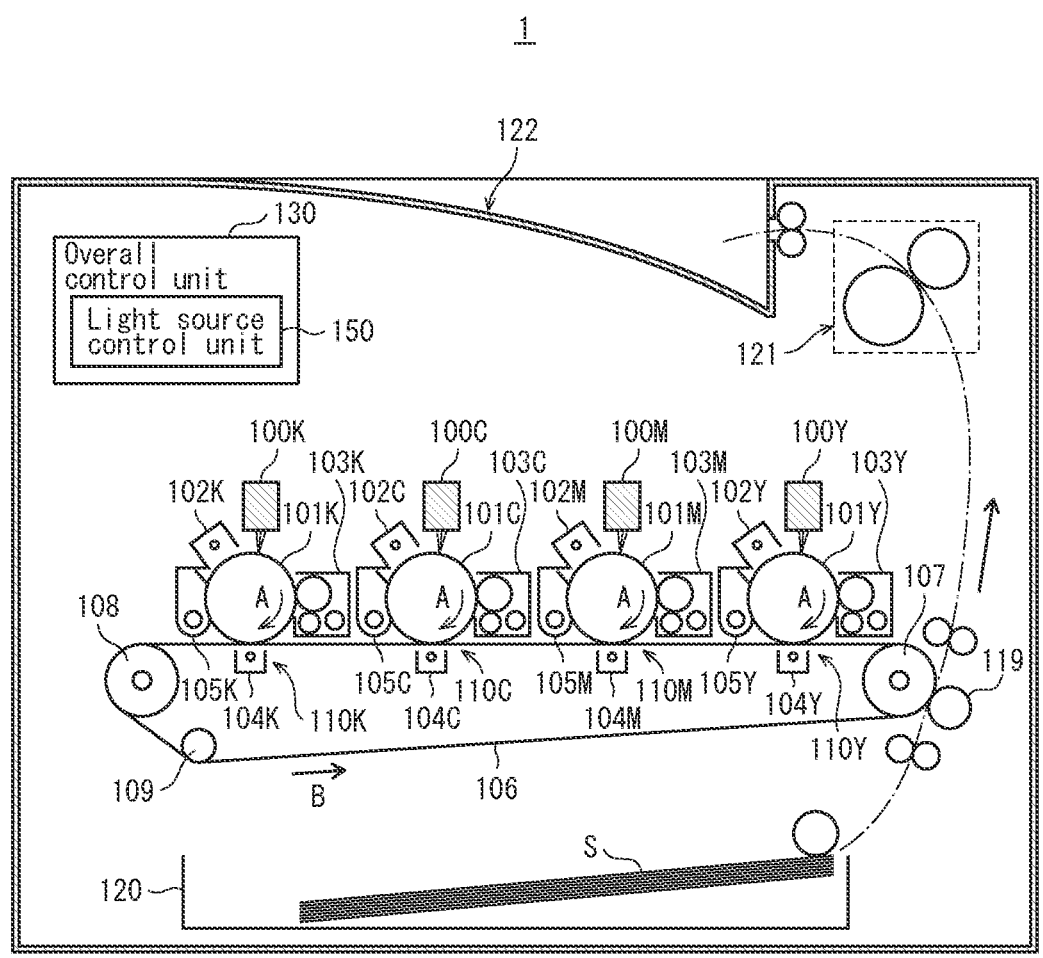
FIG. 1 is a schematic diagram of an overall structure of a printer 1 according to one or more embodiments.

FIG. 1 is a schematic diagram of an overall structure of a printer 1 according to one or more embodiments.

In FIG. 1, the printer 1 includes an image forming unit 110Y forming a yellow (Y) toner image, an image forming unit 110M forming a magenta (M) toner image, an image forming unit 110C forming a cyan (C) toner image, and an image forming unit 110K forming a black (K) toner image. The image forming units 110Y, 110M, 110C, and 110K respectively include photoreceptor drums 101Y, 101M, 101C, and 101K that rotate in directions illustrated by arrows A.

Around the photoreceptor drum 101Y (101M, 101C, 101K), a charging unit 102Y (102M, 102C, 102K), an optical writing unit 100Y (100M, 100C, 100K), a development unit 103Y (103M, 103C, 103K), a primary transfer charger 104Y (104M, 104C, 104K), and a cleaning unit 105Y (105M, 105C, 105K) are arranged in this order along an outer circumferential surface of the photoreceptor drum 101Y (101M, 101C, 101K).

The charging unit 102Y (102M, 102C, 102K) uniformly charges the outer circumferential surface of the photoreceptor drum 101Y (101M, 101C, 101K).

The optical writing unit 100Y (100M, 100C, 100K) drives light emitting elements that are arrayed in a main scanning direction based on image data from an overall control unit 130 and performs optical writing (light exposure) on the outer circumferential surface of the photoreceptor drum 101Y (101M, 101C, 101K) with use of light from the light emitting elements to form an electrostatic latent image. For example, organic electroluminescence (EL) elements, more specifically OLEDs, are used for the light emitting elements.

The developing units 103Y, 103M, 103C, and 103K supply toner of the corresponding color and develop the electrostatic latent images on the circumferential surfaces of the photoreceptor drums 101Y, 101M, 101C, and 101K, respectively, to form toner images of the colors Y, M, C, and K.

The primary transfer chargers 104Y, 104M, 104C, and 104K electrostatically transfer the toner images carried by the photoreceptor drums 101Y, 101M, 101C, and 101K onto an intermediate transfer belt 106 (primary transfer).

The cleaning units 105Y, 105M, 105C, and 105K remove electric charge and toner remaining on the outer circumferential surfaces of the photoreceptor drums 101Y, 101M, 101C, and 101K after the primary transfer. Hereinafter, the letters Y, M, C, and K are omitted when describing a structure that is in common to the image forming units 110Y, 110M, 110C, and 110K.

The intermediate transfer belt 106 is an endless belt that is suspended with tension between a driving roller 107, a driven roller 108, and a tension roller 109, and is rotated in a direction indicated by arrow B.

The primary transfer of the toner images from the photoreceptor drums 100Y, 100M, 100C, and 100K onto the rotating intermediate transfer belt 106 is performed at different timings in the order of Y, M, C, and K such that the toner images of the colors Y, M, C, and K are overlapped with each other on the intermediate transfer belt 106. Due to the primary transfer, a color toner image is formed by multiply transferring the toner images of the colors Y, M, C, and K onto the intermediate transfer belt 106.

The color toner image is conveyed by rotation of the intermediate transfer belt 106 to a position at which a secondary transfer roller 119 and the drive roller 107 sandwich the intermediate transfer belt 106 (secondary transfer nip).

When a recording sheet S is supplied from a sheet feed tray 120 in accordance with the timing at which the color toner image is conveyed by the intermediate transfer belt 106 to the secondary transfer nip, the color toner image on the intermediate transfer belt 106 is electrostatically transferred onto the recording sheet S at the secondary transfer nip (secondary transfer).

The recording sheet S is conveyed to a fixing device 121 with the color toner image carried on the recording sheet S, the color toner image is thermally fixed onto the recording sheet S by the fixing device 121, and the recording sheet S is ejected onto a sheet ejection tray 122.

Upon receiving a print job from an external device such as a personal computer (PC), the overall control unit 130 controls components such as the image forming units 110Y, 110M, 110C, and 110K to cause the components to perform image forming.

Further, the overall control unit 130 includes a light source control unit 150 performing light amount correction processing of performing control of correcting light amounts from the light emitting elements of the optical writing unit 100. The light amount correction processing corresponds to calibration described above, and in summary, is performed for each of the optical writing units 100Y, 100M, 100C, and 100K as follows.

The light source control unit 150 causes the light emitting elements to sequentially emit light one by one when in a non-image-forming period during which image forming is not performed. For each of the light emitting elements, the light amount is detected by a light detection unit.

The light detection unit includes a light receiving sensor (optical sensor) and outputs a detection signal expressing a received light amount. For each of the light emitting elements, a correction unit sets and stores a corresponding correction coefficient for correcting a drive current value that is to be supplied to the light emitting element such that the light emitting element emits a target light amount based on the outputted detection signal (detection result). When performing image forming after the light amount correction processing, for each of the light emitting elements, a current based on the correction coefficient determined in advance for the light emitting element is supplied.

Light emitting elements such as OLEDs typically have characteristics of emitting slightly different light amounts even when supplied with the same current amounts, in accordance with changes in the environment, deterioration due to long-term usage, or the like. Through repeatedly performing the light amount correction processing at defined intervals, upon occurrence of a change in the environment such as a sudden change in the temperature, or the like, unevenness of light amounts from the light emitting elements is suppressed and quality of images formed on the photoreceptor drum is maintained to be good for a long time.

(2) Structure of Optical Writing Unit

The optical writing unit 100 includes a light source substrate and a microlens array, and focuses light from the light source substrate onto the outer circumferential surface of the photoreceptor drum 101 by the microlens array.

(2-1) Structure of Light Source Substrate

Figure 2B:
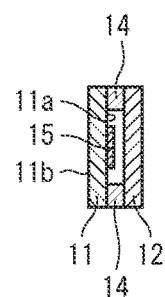
FIGS. 2A-2C are a diagram of a structure of a light source substrate according to one or more embodiments.
Figure 2A:
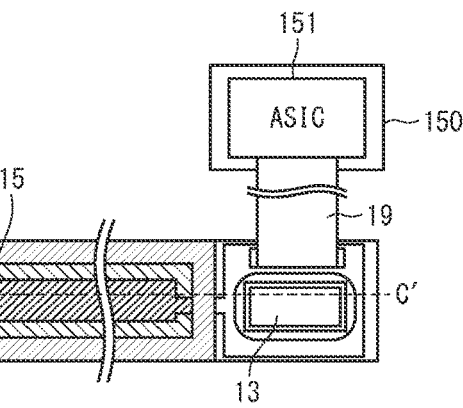
Figure 2C:
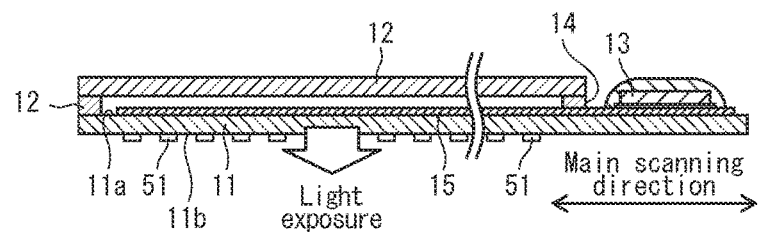

In FIGS. 2A-2C, the light source substrate 10 includes components such as a light transmissive glass substrate 11, a sealing plate 12, a driver integrated circuit (IC) 13, and the like.

On a first main surface (substrate surface) 11a of the glass substrate 11, a thin film transistor (TFT) circuit 15 is disposed. For example, 15,000 light emitting elements (not illustrated) that are each an OLED are arrayed in the main scanning direction.

Light radiated from the light emitting elements is transmitted through the glass substrate 11 and is emitted outside from a second main surface (light emitting surface) 11b of the glass substrate 11 opposite the substrate surface 11a.

On the light emitting surface 11b of the glass substrate 11, light detection units 51 are arranged. The light detection units 51 detect portions of light radiated from the light emitting elements during the light amount correction processing.

FIG. 3 is a plan diagram in which the glass substrate 11 is seen from a light emitting surface 11b side. Here, the light emitting elements 31 arranged on the substrate surface 11a of the glass substrate 11 are seen through the light emitting surface 11b in order to illustrate a positional relationship between the light detection units 51 and the light emitting elements 31.

In FIG. 3, multiple, for example, 15,000 light emitting elements 31 are divided into light emitting element groups 30 (see the enlarged portion in FIG. 3) each including N (two or greater; twelve in the example in FIG. 3) light emitting elements 31.

The light emitting element groups 30 are respectively mounted into different regions on the substrate surface 11a of the glass substrate 11. Each of the light emitting element groups includes two light emitting element arrays 30a and 30b, and the two light emitting element arrays 30a and 30b each include six light emitting elements 31 arranged at a defined pitch in the main scanning direction (first direction). The light emitting element arrays 30a and 30b are arrayed in a sub scanning direction (second direction) at a defined interval, and the light emitting elements 31 of the light emitting element array 30a and the light emitting elements 31 of the light emitting element array 30b are arranged at positions shifted from each other in the main scanning direction. The light emitting element array 30a forms a first subgroup including light emitting elements and the light emitting element array 30b forms a second subgroup including light emitting elements other than the light emitting elements of the first subgroup.

The light emitting element groups 30 are divided into three element group arrays 91, 92, and 93 in each of which light emitting element groups 30 are arrayed at intervals in the main scanning direction.

The element group arrays 91, 92, and 93 are arranged at intervals in the sub scanning direction and, for each of the element group arrays 91, 92, and 93, the light emitting element groups 30 of the element group array are arranged at positions shifted in the main scanning direction from the light emitting element groups of the other two of the element group arrays. Such arrangement of the light emitting element groups 30 is hereinafter referred to as three-array staggered arrangement.

All the light emitting elements 31 of a light emitting element group 30 are at positions shifted from each other in the main scanning direction, and all the light emitting element groups 30 are at positions shifted from each other in the main scanning direction. Accordingly, all the light emitting elements 31 on the glass substrate 11 are at positions shifted from each other in the main scanning direction. All the light emitting elements 31 on the glass substrate 11 form a light emitting unit 90.

The light detection units 51 on the light emitting surface 11b of the glass substrate 11 correspond one-to-one to the light emitting element groups 30, and in an X-Y plane rectangular coordinate system whose X-axis is the main scanning direction and whose Y-axis is the sub scanning direction, each of the light detection units 51 is disposed in proximity of the corresponding light emitting element group 30.

The light detection units 51 here each include a light receiving sensor such as a photodiode. The light detection units 51 are arranged such that their light receiving surfaces (detection surfaces) face the light emitting surface 11b of the glass substrate 11, and output detection signals expressing amounts of light radiated from each of the twelve light emitting elements 31 of the corresponding light emitting element group 30, transmitted through the glass substrate 11, and incident on the light receiving surface.

Referring back to FIGS. 2A-2C, the region on the substrate surface 11a of the glass substrate 11 in which the TFT circuit 15 is disposed (mounting region) is a sealed region to which the sealing plate 12 is attached through spacer frame bodies 14. This structure seals the sealed region such that the sealed region does not contact the external air, with dry nitrogen or the like sealed therein. Note that moisture absorbent may also be sealed in the sealed region for moisture absorption. The sealing plate 12 may be, for example, sealing glass, or may be made of material other than glass.

Outside the sealing region on the substrate surface 11a of the glass substrate 11, the driver IC 13 is mounted. The light source control unit 150 connects to the driver IC 13 and includes an application-specific integrated circuit (ASIC) 151 for controlling the light source substrate 10. The ASIC 151 inputs a digital luminance signal of image data through a flexible wire 19 into the driver IC 13. For each of the light emitting elements 31, the driver IC 13 converts the digital luminance signal to an analog luminance signal, and generates and outputs a drive current for the light emitting element 31 in accordance with the converted analog luminance signal. The driver IC is hereinafter referred to as a drive circuit.

(2-2) Structure of Microlens Array

Figure 4A:
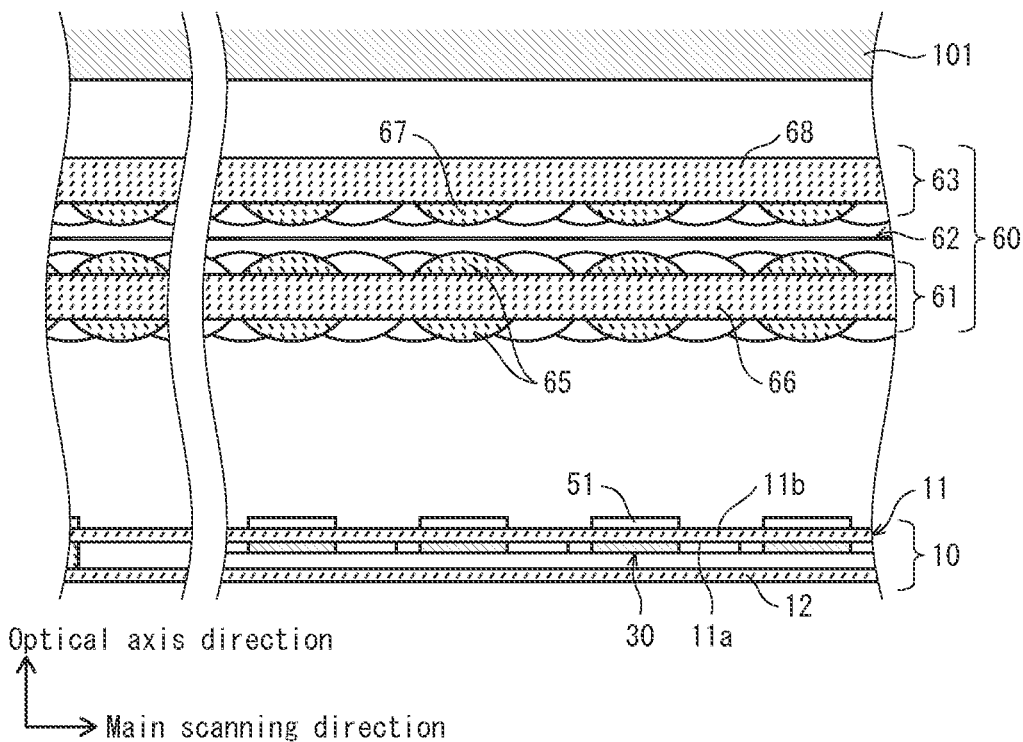
FIG. 4A is a vertical cross-sectional diagram of a structure of a microlens array.

FIG. 4A is a vertical cross-sectional diagram of the structure of the microlens array 60, illustrated along with a portion of the light source substrate 10 and a portion of the photoreceptor drum 101.

In FIG. 4A, the microlens array 60 is a so-called telecentric optical system in which a G1 lens member 61, an aperture member 62, and a G2 lens member 63 are arranged in this order from the light source substrate 10. The G1 lens member 61 and the G2 lens member 63 are each a transparent member made of resin material or glass material.

The G1 lens member 61 includes a plate-like member 66 and plano-convex lenses (microlenses) fixed on two main surfaces of the plate-like member 66. The G2 lens member 63 includes a plate-like member 68 and plano-convex lenses (microlenses) fixed on a main surface of the plate-like member 66 closer to the light source substrate 10. The plano-convex lenses may be spheric or aspheric. The optical axes of the G1 lens member match the optical axes of the G2 lens member.

Figure 4B:
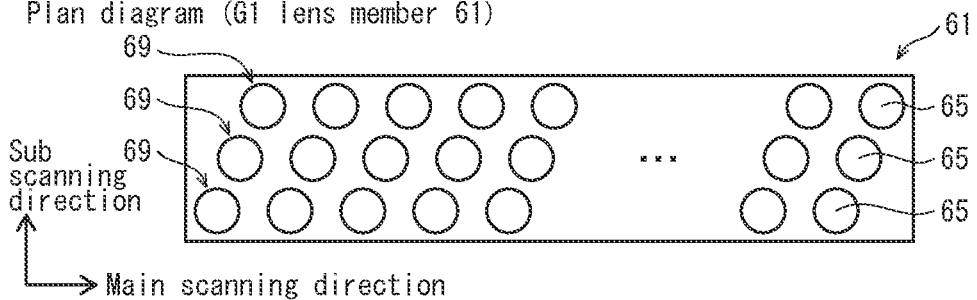
FIG. 4B is a plan diagram of a G1 lens member.

FIG. 4B is a plan diagram of the G1 lens member 61.

In FIG. 4B, the G1 lens member 61 includes three lens arrays 69 that are arrayed at intervals in the sub scanning direction and that each include microlenses 65 arrayed at a defined pitch in the main scanning direction. The lens arrays 69 are arranged such that, for each of the lens arrays 69, the microlenses 65 of the lens array 69 are at positions shifted in the main scanning direction from the microlenses 65 of the other two of the lens arrays 69. The arrangement of the microlenses 65 matches the three-line staggered arrangement of the light emitting element groups 30.

The microlenses 65 form pairs of plano-convex lenses each functioning as a biconvex lens and refracting light from the twelve light emitting elements 31 of a light emitting element group 30 that overlaps with the microlens 65 when seen from an optical axis direction. That is, the microlenses 65 correspond one-to-one to the light emitting element groups 30.

The G2 lens member 63 includes, in a manner similar to the G1 lens member 61, microlenses (plano-convex lenses) 67 that are disposed in the three-array staggered arrangement. The microlenses 67 correspond one-to-one to the pairs of microlenses 65 and refract light from the twelve light emitting elements 31 of a light emitting element group 30 that overlaps with the microlens 67 when seen from the optical axis direction.

Figure 4C:
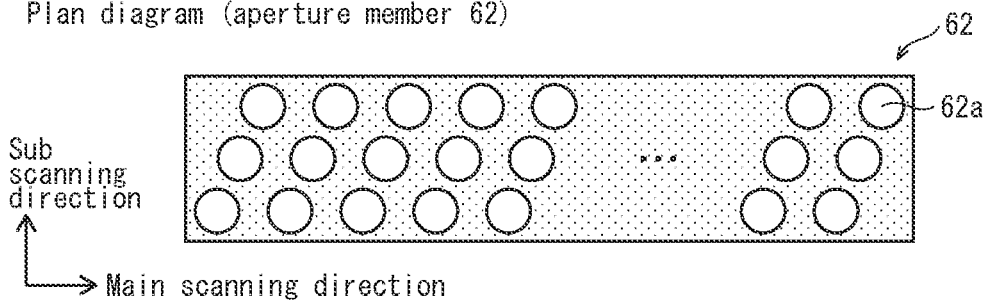
FIG. 4C is a plan diagram of an aperture member.

FIG. 4C is a plan diagram of the aperture member 62. In FIG. 4C, the aperture member 62 is a plate-like member made of material having light-shielding property, such as resin or metal. The aperture member 62 has through-holes 62a that correspond one-to-one to sets of a pair of microlenses 65 and a microlens 67 that overlap with the through-holes 62a when seen from the optical axis direction. Light emitted from the light emitting elements 31 is transmitted through the corresponding microlenses 65, and among the light emitted from the light emitting elements 31 and transmitted through the corresponding microlenses 65, light portions entering the through-holes 62a of the aperture member 62 progress to the microlens 67 of the G2 lens member 63, and the remaining light portions are shielded.

(2-3) Paths of Light Radiated from Light Emitting Elements

Figure 5:
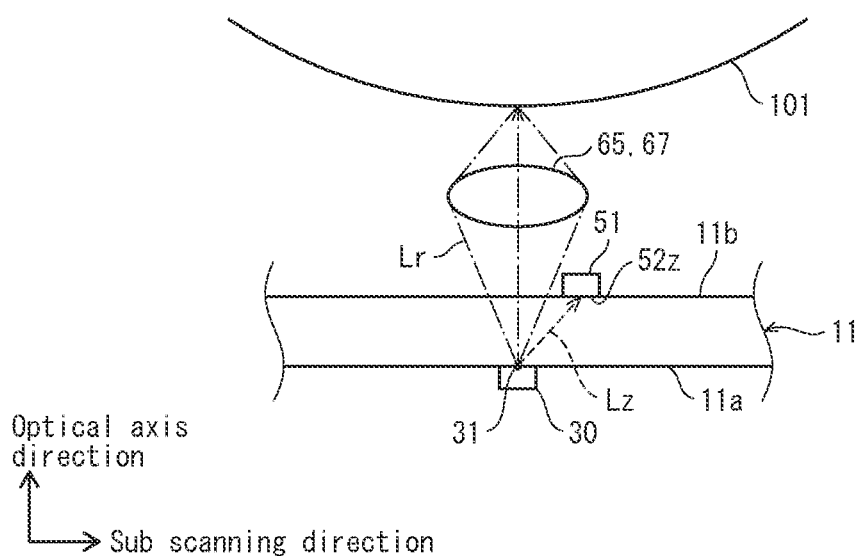
FIG. 5 is a schematic diagram of paths of light radiated from a light emitting element of a light emitting element group.

FIG. 5 is a schematic diagram of paths of light radiated from a light-emitting element 31 of a light emitting element group 30. The left-right direction in FIG. 5 is the sub scanning direction. FIG. 5 further illustrates a light detection unit 51, microlenses 65, 67 corresponding to the light emitting element group 30, and the glass substrate 11. Note that the aperture member 62 is not illustrated.

In FIG. 5, of light radiated from the light emitting element 31 disposed on the substrate surface 11a of the glass substrate 11, light Lr transmitted through the glass substrate 11 and emitted outside from the light emitting surface 11b is focused by the corresponding microlenses 65, 67 and is imaged onto the photoreceptor drum 101. Due to this, optical writing onto the photoreceptor drum 101 is performed during image forming.

The light detection unit 51 is disposed in a region on the light emitting surface 11b of the glass substrate 11 other than the region through which, of light radiated from the light emitting element 31 of the corresponding light emitting element group 30, light that is guided to the photoreceptor drum 101 is transmitted.

Of light radiated from the light emitting element 31 and transmitted through the glass substrate 11, light Lz that advances to the light detection unit 51 is emitted out of the glass substrate 11 from the light emitting surface 11b and is incident on a light receiving surface 52z of the light receiving sensor of the light detection unit 51. Due to this, the light detection unit 51 outputs a detection signal expressing a light amount incident thereon. The greater the light amount radiated from the light emitting element 31, the greater the amount of the light Lz. Accordingly, the detection result of the light Lz by the light detection unit 51 serves as an indicator of the amount of the light Lr for performing optical writing onto the photoreceptor drum 101. The detection signal is used in light amount correction processing during the non-image-forming period.

(3) Light Amount Correction Processing

Figure 6:
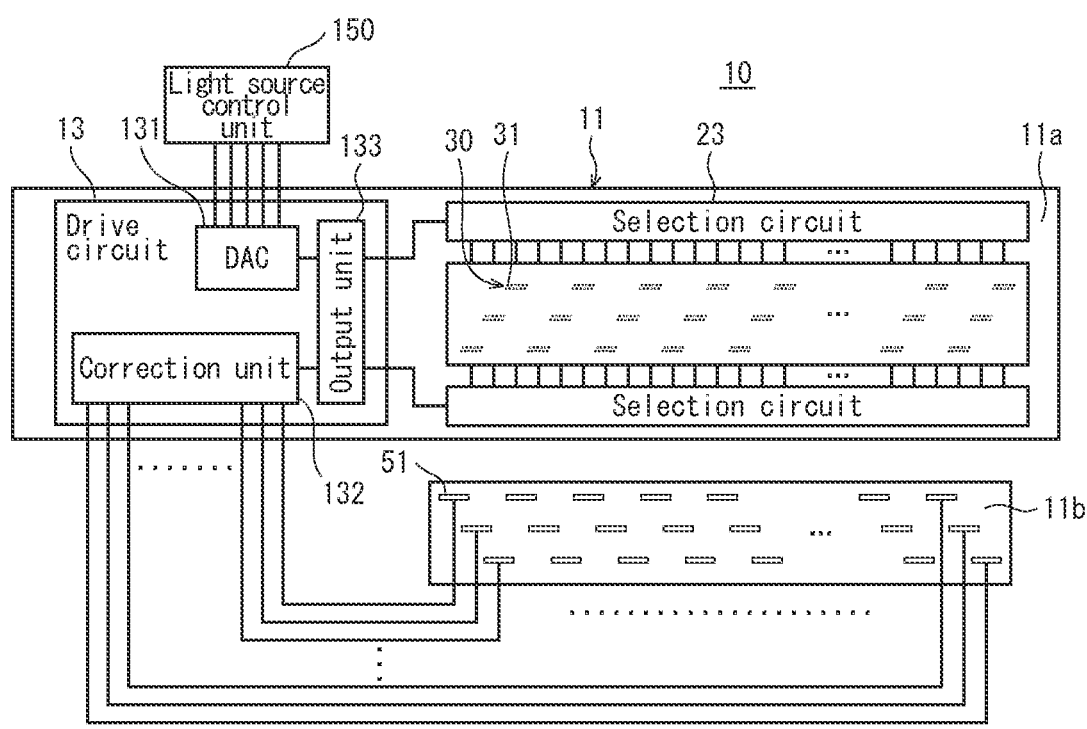
FIG. 6 is a block diagram of an electronic circuit system for performing control and light amount correction processing of light emitting elements.

FIG. 6 is a block diagram of an electronic circuit system for performing control and light amount correction processing of the light emitting elements 31. In FIG. 6, the substrate surface 11a and the light emitting surface 11b of the glass substrate 11 are illustrated separately in order to clearly illustrate the circuit structure. This system includes, in addition to the light emitting elements 31 and the light detection units 51, the drive circuit 13 and a selection circuit 23.

The selection circuit 23 is included in the TFT circuit 15 disposed on the substrate surface 11a of the glass substrate 11, and sequentially connects the light emitting elements 31 one by one to the drive circuit 13.

The drive circuit 13 includes a digital-to-analog converter (DAC) 131, a correction unit 132, and an output unit 133.

Upon receiving digital image data transmitted from the light source control unit 150, the DAC 131 converts the received image data to analog luminance signals (signals expressing light amounts) respectively corresponding to the light emitting elements 31 and transmits the converted analog luminance signals to the output unit 133.

The correction unit 132 receives detection signals from the light detection units 51 arranged on the light emitting surface 11b of the glass substrate 11 and updates, for each of the light emitting element groups 30 corresponding to the light detection units 51, correction coefficients for correcting light amounts from the light emitting elements 31 of the light emitting element group 30 each time the light amount correction processing is performed. When performing image forming after the updating, the correction unit 132 transmits the updated correction coefficients, which are in one-to-one correspondence to the light emitting elements 31, to the output unit 133.

For each of the light emitting elements 31, the output unit 133 performs correction through increasing or decreasing a current amount corresponding to the luminance signal for the light emitting element 31 received from the DAC 131 based on the correction coefficient received from the correction unit 132, and outputs the corrected current as the driving current for causing the light emitting element 31 to emit light.

Figure 7:
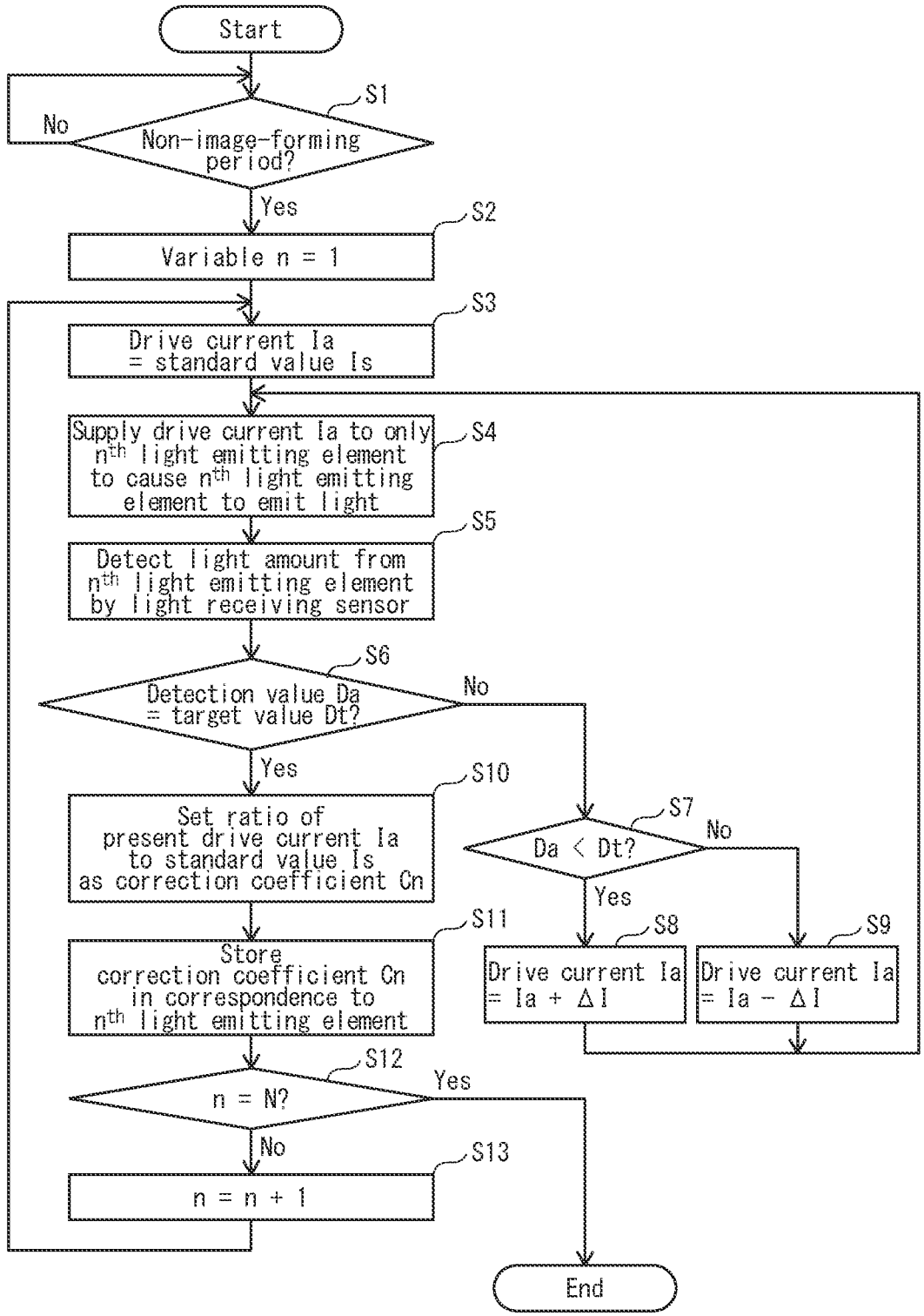
FIG. 7 is a flowchart of the light amount correction processing.

FIG. 7 is a flowchart of the light amount correction processing. The light amount correction processing is performed through cooperation of the light source control unit 150 and the drive circuit 13 for each of the light emitting element groups 30 on the basis of the detection results of the light detection unit 51 corresponding to the light emitting element group 30. FIG. 7 shows light amount correction processing for a light emitting element group 30, and the light amount correction processing is performed in parallel with the other light emitting element groups 30 as well.

In FIG. 7, when determination is made that the printer is in the non-image-forming period (Yes in step S1), a variable n expressing a number for distinguishing the light emitting elements 31 of a light emitting element group 30 from one another is set to 1 (step S2). When a light emitting element group 30 includes N light emitting elements 31, the variable n is set to an integer in a range from 1 to N, and the N light emitting elements 31 are distinguished from one another as the first light emitting element 31, the second light emitting element 31, . . . and the $N^{th}$ light emitting element 31.

The value of a drive current Ia for the $n^{th}$ light emitting element 31 is set to a standard value Is (step S3). The standard value Is is a current value that is supposed to be required to cause the $n^{th}$ light emitting element 31 to emit a target light amount, and is defined in advance by experiments or the like.

Among the twelve light emitting elements 31, only the $n^{th}$ light emitting element 31 (the first light emitting element 31 in this case) is supplied with the drive current Ia and is caused to emit light (step S4).

The amount of light from the $n^{th}$ light emitting element 31 (corresponding to the light Lz in FIG. 5) is detected by the light receiving sensor of the light detection unit 51 (step S5), and determination is made of whether or not the detection value Da equals the target value Dt (step S6). The target value Dt is defined in advance through experiments or the like as a value that the light detection unit 51 is supposed to detect when the light emitting element 31 emits a light amount that is suitable for performing optical writing onto the photoreceptor drum 101.

When determination is made that the detection value Da equals the target value Dt (Yes in step S6), the processing advances to step S10.

When determination is made that the detected value Da does not equal the target value Dt (No in step S6) and the detected value Da is smaller than the target value Dt (Yes in step S7), a value obtained by adding a defined value ΔI to the value of the present drive current Ia is set as a new drive current Ia (step S8), and the processing returns to step S4. In contrast, when the detected value Da is greater than the target value Dt (No in step S7), a value obtained by subtracting the defined value ΔI from the value of the present drive current Ia is set as a new drive current Ia (step S9), and the processing returns to step S4.

In step S4, the newly set drive current Ia is supplied to the $n^{th}$ light emitting element 31 (the first light emitting element 31 in this case). Due to this, the light amount from the first light emitting element 31 switches to a light amount increased or decreased by a light amount corresponding to the defined current value ΔI.

After performing step S5 again, determination is made in step S6 of whether or not the detected value Da equals the target value Dt. When determination is made that the detected value Da does not equal the target value Dt, the processing goes through steps S7 through S9 again and returns to steps S4 through S6. Steps S4 through S9 are repeated until determination is made that the detected value Da equals the target value Dt, and when determination is made that the detected value Da equals the target value Dt (Yes in step S6), the processing advances to step S10.

In step S10, a ratio of the value of the present drive current Ia to the standard value Is is set as the correction coefficient Cn for the $n^{th}$ light emitting element 31. For example, for the first light emitting element 31, the correction coefficient Cn is 1 when the value of the present drive current Ia equals the standard value Is, and the correction coefficient Cn is 1.2 when the value of the present drive current Ia is 1.2 times greater than the standard value Is.

The set correction coefficient Cn is stored as correction coefficient information corresponding to the $n^{th}$ light emitting element 31 (step S11), and the processing advances to step S12.

FIG. 8 illustrates a table 132a in which the correction coefficient information is stored, and expresses a relationship in which the numbers n of the light emitting elements 31 correspond one-to-one to the correction coefficients Cn. The table 132a is stored in a nonvolatile storage unit (not illustrated) in the correction unit 132 in FIG. 6, and is rewritten each time a new correction coefficient Cn is calculated. Due to this, the correction coefficient Cn for the $n^{th}$ light emitting element 31 is updated to an optimal value at present.

Referring back to FIG. 7, in step S12, determination is made of whether or not the variable n at present equals the total number N (twelve in this case) of the light emitting elements 31 of the light emitting element group 30.

When determination is made that the variable n at present does not equal the total number N (No in step S12), a value obtained by incrementing 1 to the variable n is set as a new variable n (step S13) and the processing returns to step S3.

In step S3, the value of the drive current Ia for the light emitting element 31 corresponding to the present variable n (the second light emitting element 31 in this case) is set to the standard value Is. In step S4, the drive current Ia set in step S3 is supplied only to the second light emitting element 31 so as to cause the second light emitting element 31 to emit light.

From then on, processing from step S5 to step S11 is performed and the correction coefficient Cn for the second light emitting element 31 is updated.

The processing from step S3 to step S13 is repeatedly performed to set, sequentially for each of the third to the $N^{th}$ light emitting elements 31, a corresponding correction coefficient Cn. Due to this, the light receiving unit 51 corresponding to the light emitting element group 30 sequentially detects light from N light emitting elements 31 of the light emitting element group 30 one by one, and based on the detection results, light amounts from the light emitting elements 31 are corrected.

When determination is made that the variable n equals N in step S12 (in this example, when the correction coefficient Cn for the twelfth light emitting element 31 is updated) (Yes in step S12), the light amount correction processing for the light emitting element group 30 is ended.

The other light emitting element groups 30 are also in one-to-one correspondence to the other light detection units 51. Accordingly, through performing the light amount correction processing as described above for each pair of a light emitting element group 30 and a light detection unit 51, the correction coefficients Cn for all the light emitting elements 31 of all the light emitting element groups 30 are updated.

When performing image forming after the light amount correction processing, the correction unit 132 reads out the (updated) correction coefficients Cn for the light emitting elements 31 that are currently stored in the table 132a. The read correction coefficients Cn for the light emitting elements 31 are transmitted to the output unit 133 and are used in the output unit 133 for correcting, through increasing or decreasing, the current amounts corresponding to the luminance signals that are input to the light emitting elements 31. Due to this, the correction coefficients Cn for the light emitting elements 31 are updated each time the light amount correction processing is performed, and when performing image forming after the light amount correction processing, all the light emitting elements 31 can perform optical writing onto the photoreceptor drum 101 by using suitable light amounts.

As described above, in the previously-described embodiments, the light emitting element groups 30 correspond one-to-one to the light detection units 51 in an optical system in which the light emitting element groups 30 correspond one-to-one to the microlenses. Due to this, each of the light detection units 51 (light receiving sensors) has to perform light amount detection for only the light emitting elements 31 of the corresponding light emitting element group 30.

For example, when referring to a time length required for correction for a light emitting element 31 including light amount detection and correction coefficient determination (time length required for steps S3 through S11 described above) as T seconds, the total time length Ta required for light amount correction performed by a light detection unit 51 is (N×T) seconds. In contrast, in the conventional structure, a light sensor is used for a plurality of, for example, M light emitting element groups. Accordingly, the time length Ta of (M×N×T) seconds is required, which is longer than that in the above-described embodiments.

Through simultaneously performing the light amount correction processing for each of the light emitting element groups 30, or through performing the light amount correction processing such that the light amount correction processing for the light emitting element groups 30 is partially simultaneous (time periods during which the light amount correction processing for the light emitting element groups 30 is performed partially overlap with each other), the time length required for calibration becomes shorter than in the conventional structure.

Accordingly, when performing the light amount correction processing during the non-image-forming period, e.g. after the end of the current job and until the start of a forthcoming job, the timing for starting the forthcoming job can be made earlier in accordance with reduction of the time length required for calibration. This is convenient for the user who has issued the forthcoming job because waiting time until the end of the light amount correction processing becomes shorter.

An example of a structure in which the light detection unit 51 includes one light receiving sensor is described in the previously-described embodiments. In one or more embodiments, the light detection unit 51 includes two light receiving sensors, namely one light receiving sensor corresponding to the light emitting element array 30a of the light emitting element group 30 and the other light receiving sensor corresponding to the light emitting element array 30b of the light emitting element group 30. Hereinafter, description of the same features as those in the previously-described embodiments is not provided and the same components as those in the previously-described embodiments have the same reference numbers in order to avoid duplicate description.

Figure 9:
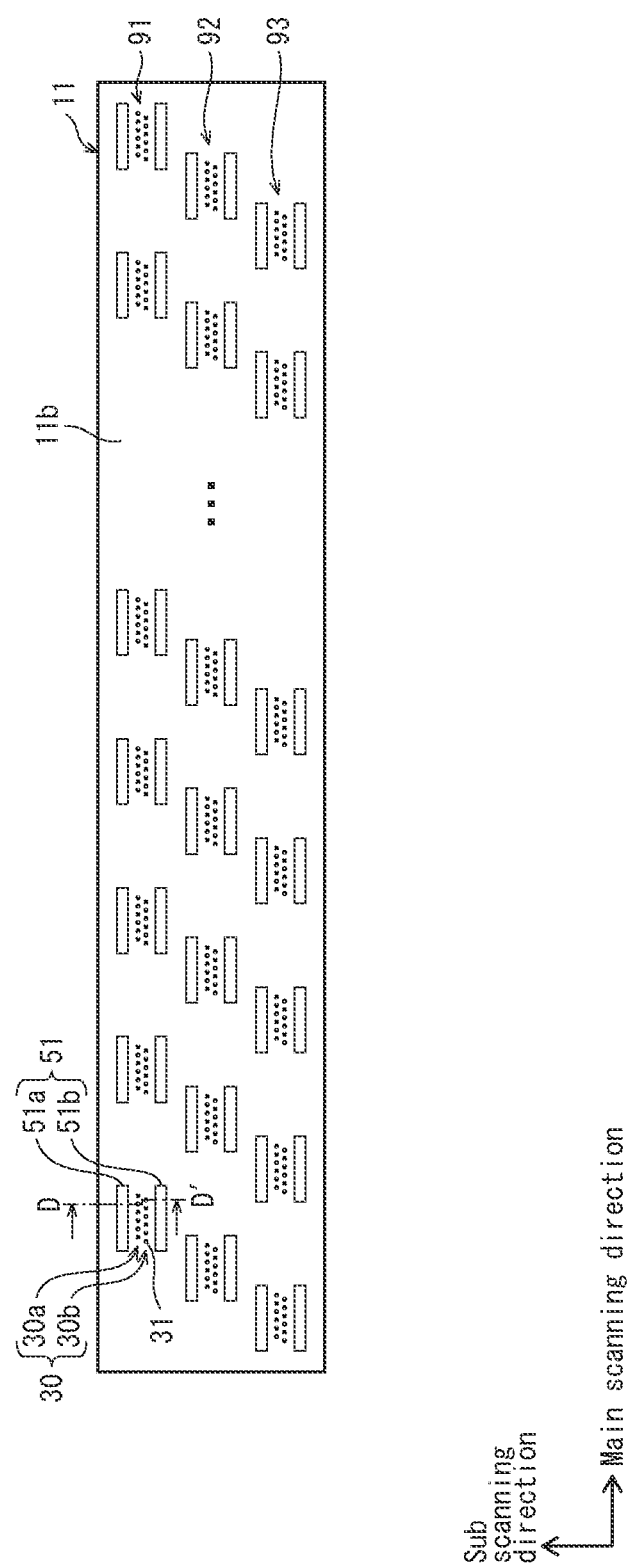
FIG. 9 is a plan diagram of a glass substrate according to one or more embodiments, seen from the light emitting surface side.

FIG. 9 is a plan diagram of the glass substrate 11 according to one or more embodiments, seen from the light emitting surface 11b side. Here, the light emitting elements 31 arranged on the substrate surface 11a are seen through the light emitting surface 11b. In FIG. 9, only the light emitting element groups 30 and pairs of light receiving sensors 51a and 51b are illustrated in order to clearly illustrate a positional relationship between the light emitting element groups 30 and the pairs of light receiving sensors 51a and 51b.

In FIG. 9, a light detection unit 51 corresponding to a light emitting element group 30 includes two light receiving sensors 51a and 51b. The light receiving sensor 51a is arranged at one side of the light emitting element group 30 in the sub scanning direction, and the light receiving sensor 51b is arranged at the other side of the light emitting element group 30 in the sub scanning direction. As in the previously-described embodiments, the light receiving sensors 51a and 51b each include a photodiode or the like.

Figure 10A:
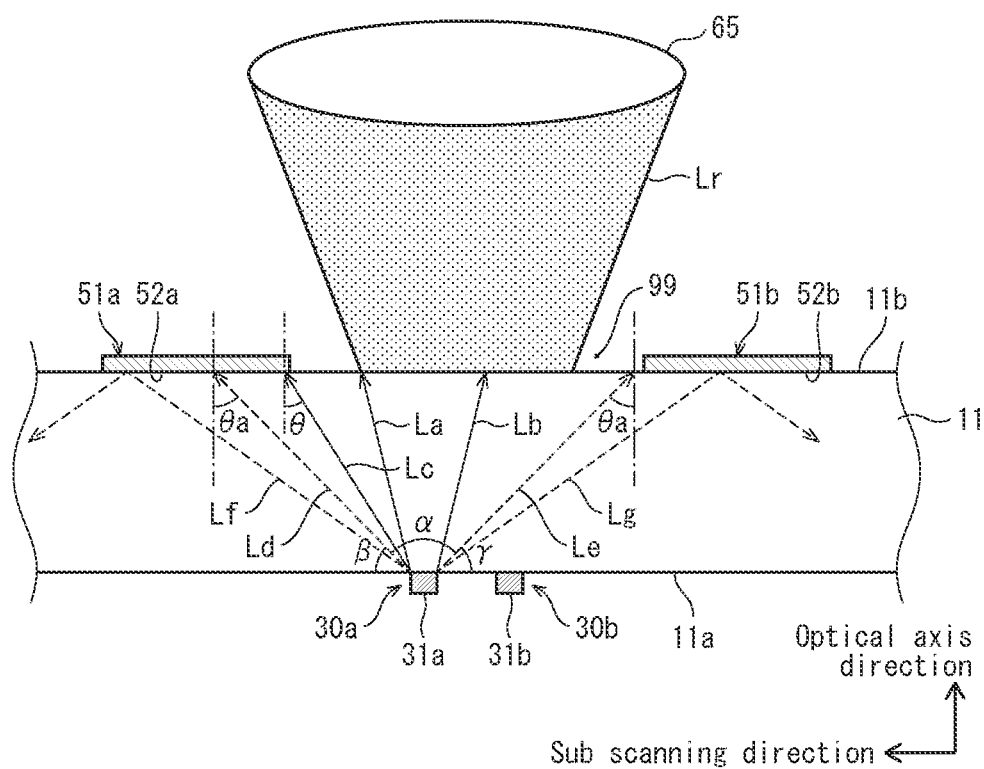
FIG. 10A and FIG. 10B are schematic cross-sectional diagrams taken along line D-D' in FIG. 9.

FIG. 10A is an overall cross-sectional diagram taken along line D-D' in FIG. 9. FIG. 10A further illustrates microlenses 65 corresponding to the light emitting element group 30 and light Lr focused by the microlenses 65. Due to necessity for clearly illustrating paths of light radiated from the light emitting elements, the substrate 11 is not hatched. This applies to FIG. 10A, FIG. 13, and the like that are referred to below.

In FIG. 10A, on the substrate surface 11a of the glass substrate 11, a light emitting element 31a of a light emitting element array 30a and a light emitting element 31b of a light emitting element array 30b are arranged at an interval in the sub scanning direction. On the light emitting surface 11b, the light receiving sensors 51a and 51b are arranged at an interval in the sub scanning direction with the light receiving surface 52a of the light receiving sensor 51a and the light receiving surface 52b of the light receiving sensor 51b facing the light emitting surface 11b. Note that the light emitting surface 11b of the glass substrate 11 may be in direct contact with the light receiving surface 52a of the light receiving sensor 51a and the light receiving surface 52b of the light receiving sensor 51b without an air layer provided therebetween, or a small gap constituting an air layer may be present between the light emitting surface 11b of the glass substrate 11 and the light receiving surfaces 52a, 52b of the light receiving sensors 51a, 51b. Hereinafter, description is provided of an example of a structure in which an air layer is provided.

FIG. 10A illustrates only light radiated from the light emitting element 31a transmitted through the glass substrate 11, and arrows La through Lg express light included in the light radiated from the light emitting element 31a. An angle θa is, when the glass substrate 11 and a space (air) 99 are two media, a critical angle of light transmitted through the glass substrate 11 that is one medium relative to the outer space 99 that is the other medium.

Of light transmitted through the glass substrate 11, light having an incident angle θ to the light emitting surface 11b (boundary surface) of the glass substrate 11 that is smaller than the critical angle θa (e.g. light expressed by solid line arrows La, Lb, and Lc) is refracted by the light emitting surface 11b and reaches the outer space 99. Such light is referred to as transmitted light in the sense that such light is transmitted through the light emitting surface 11b of the glass substrate 11.

Light La and light Lb progress toward the microlenses 65 and are focused onto the photoreceptor drum 101 by the microlenses 65. Light Lc is incident on the light receiving surface 52a of the light receiving sensor 51a. Light Ld and light Le have an incident angle θ that equals the critical angle θa.

In contrast, light having an incident angle θ greater than the critical angle θa (e.g. Lf, Lg expressed by broken line arrows) is totally reflected at the light emitting surface 11b, and therefore is not transmitted through the light emitting surface 11b to reach the outer space 99. Such light is referred to as totally reflected light in the sense that such light is totally reflected at the light emitting surface 11b of the glass substrate 11. Light Lf is not incident on the light receiving surface 52a of the light receiving sensor 51a, and light Lg is not incident on the light receiving surface 52b of the light receiving sensor 51b.

Due to the relationship between the incident angle θ and the critical angle θa, of light radiated from the light-emitting element 31a, light that is transmitted through an angle range α that is a region between the light Ld and the light Le is transmitted light; all the light that is transmitted through an angle range β and an angle range γ, excluding the angle range α, is totally reflected light.

Accordingly, of light radiated from the light emitting element 31a and progressing toward the light receiving surface 52a of the light receiving sensor 51a, light transmitted through the angle range α (e.g. Lc) is incident on the light receiving surface 52a as transmitted light. In contrast, all the light radiated from the light emitting element 31a and progressing toward the light receiving surface 52b of the light receiving sensor 51b has a greater incident angle θ than the light Le and is transmitted through the angle range γ as totally reflected light, and therefore is not incident on the light receiving surface 52b.

That is, light radiated from the light emitting element 31a is partially received by the light receiving surface 52a of the light receiving sensor 51a but is not received at all by the light receiving surface 52b of the light receiving sensor 51b. This applies to all of the six light emitting elements 31a of the light emitting element array 30a.

Light radiated from the light emitting elements 31a being detectable by the light receiving sensor 51a and not being detectable by the light receiving sensor 51b means that the light receiving sensor 51a is provided exclusively for light amount detection of the light emitting element array 30a.

In the above, description is provided of the relationship between the light emitting elements 31a and the light receiving sensor 51a, but the light emitting elements 31b of the light emitting element array 30b and the light receiving sensor 51b are in a similar relationship.

Figure 10B:
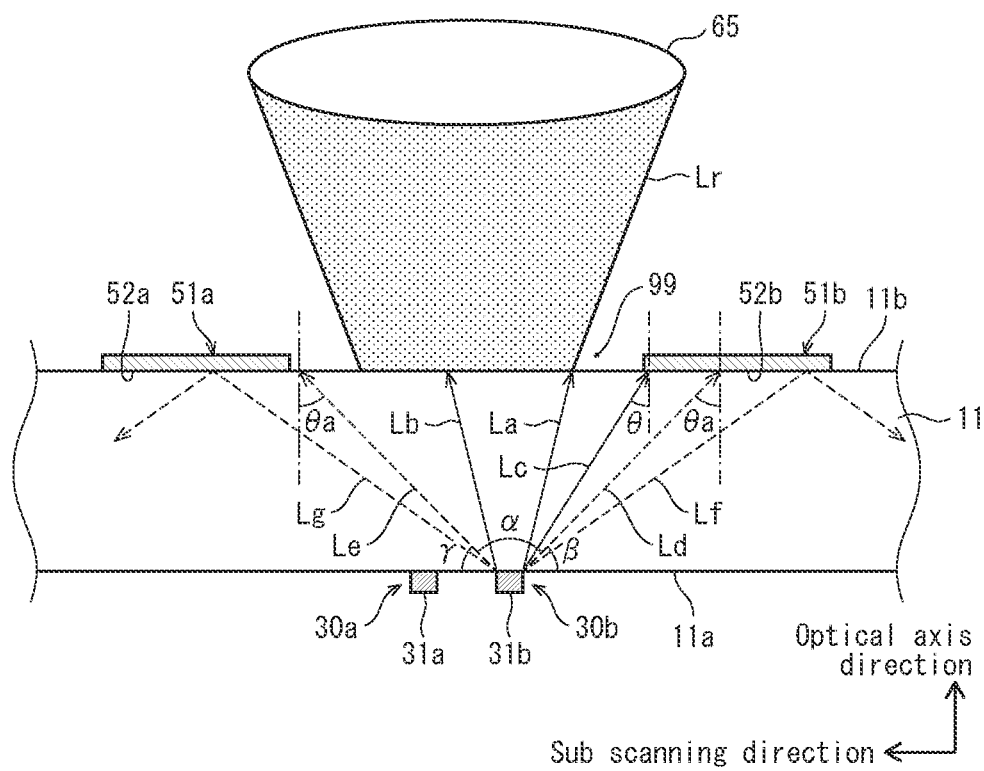

FIG. 10B illustrates only light radiated from the light emitting element 31b transmitted through the glass substrate 11. In a manner similar to FIG. 10A, arrows La through Lg express light included in the light radiated from the light emitting element 31b, and the critical angle is expressed by θa.

In FIG. 10B, of light radiated from the light emitting element 31b and progressing toward the light receiving surface 52b of the light receiving sensor 51b, light transmitted through the angle range α (e.g. Lc) is incident on the light receiving surface 52b as transmitted light. In contrast, all the light radiated from the light emitting element 31b and progressing toward the light receiving surface 52a of the light receiving sensor 51a has a greater incident angle θ than the light Le and is transmitted through the angle range γ as totally reflected light, and therefore is not incident on the light receiving surface 52a.

That is, light radiated from the light emitting element 31b is partially received by the light receiving surface 52b of the light receiving sensor 51b but is not received at all by the light receiving surface 52a of the light receiving sensor 51a. This applies to all of the six light emitting elements 31b of the light emitting element array 30b.

Light radiated from the light emitting elements 31b being detectable by the light receiving sensor 51b and not being detectable by the light receiving sensor 51a means that the light receiving sensor 51b is a sensor provided exclusively for light amount detection of the light emitting element array 30b.

As described above, light radiated from the light emitting elements 31a is not received by the light receiving sensor 51b and light radiated from the light emitting elements 31b is not received by the light receiving sensor 51a. Accordingly, even when a light emitting element 31a and a light emitting element 31b are caused to emit light at the same time during the light amount correction processing, light radiated from the light emitting element 31a does not affect detection values of the light receiving sensor 51b and light radiated from the light emitting element 31b does not affect detection values of the light receiving sensor 51a.

This achieves a structure in which, when performing the light amount correction processing, for each of the light emitting element groups 30, the six light emitting elements 31a of the light emitting element array 30a are individually caused to emit light one by one and the light amounts from the six light emitting elements 31a are detected by the light receiving sensor 51a, and in parallel, the six light emitting elements 31b of the light emitting element array 30b are individually caused to emit light one by one and the light amounts from the six light emitting elements 31b are detected by the light receiving sensor 51b.

Specifically, the processing in FIG. 7 is performed individually and in parallel for the light emitting element array 30a and for the light emitting element array 30b. For processing for the light emitting element array 30a, the light receiving sensor 51a corresponding to the light emitting element array 30a is used, and for processing for the light emitting element array 30b, the light receiving sensor 51b corresponding to the light emitting element array 30b is used. For each of the processing for the light emitting element array 30a and the processing for the light emitting element array 30b, the total number N in step S12 is replaced with six.

Compared to cases where the total number N is twelve, the time length Ta required for the light amount correction processing is further shortened due to the total number N being reduced to half.

Further, no light radiated from the light emitting elements 31b (or 31a) of the light emitting element array 30b (or 30a), which do not correspond to the light emitting elements 31b (or 31a), is incident on the light receiving sensor 51a (or 51b). For example, in a structure in which light from the light emitting elements 31b of the light emitting element array 30b is partially incident on the light receiving sensor 51a, the light from the light emitting elements 31b mixes with the light from the light emitting elements 31a of the light emitting element array 30a. Accordingly, one of the light amount correction processing for the light emitting element array 30a and the light amount correction processing for the light emitting element array 30b needs to be ended before the other of them is started. Such a structure requires a greater time length for the light amount correction processing than a structure in which the light amount correction processing for the light emitting element array 30a and the light amount correction processing for the light emitting element array 30b are performed in parallel. Further, when the light amount correction processing for the light emitting element array 30a and the light amount correction processing for the light emitting element array 30b are performed in parallel in such a structure, due to light mixture described above, light amount detection accuracy may deteriorate and consequently deterioration of quality of images to be formed may occur. Such light mixture does not occur in one or more embodiments, and therefore light amount detection accuracy is improved while the time length for the light amount correction processing is reduced.

As described above, in a structure in which the light emitting element groups 30 correspond one-to-one to the light detection units 51, positions of the light receiving sensor 51a corresponding to the light emitting element array 30a and the light receiving sensor 51b corresponding to the light emitting element array 30b are determined such that light radiated from the light emitting elements 31a of the light emitting element array 30a is detected only by the light receiving sensor 51a and light radiated from the light emitting elements 31b of the light emitting element array 30b is detected only by the light receiving sensor 51b. This structure makes use of characteristics of light such that, of light radiated into the glass substrate 11, light having an incident angle θ to the light emitting surface 11b greater than the critical angle θa is totally reflected. Due to this, the time length Ta required for the light amount correction processing is further shortened and light amount detection accuracy is further improved.

Where, for each of the light emitting elements 31a of the light emitting element array 30a (first subgroup) that corresponds to the light receiving sensor 51a, light radiated from the light emitting element 31a and transmitted through the glass substrate 11 is first radiated light, light having an incident angle θ to the light emitting surface 11b smaller than the critical angle θa among the first radiated light is first transmitted light, light having an incident angle θ to the light emitting surface 11a greater than the critical angle θa among the first radiated light is first totally reflected light, and for each of the light emitting elements 31b of the light emitting element array 30b (second subgroup) that corresponds to the light receiving sensor 51b, light emitted from the light emitting element 31b and transmitted through the glass substrate 11 is second radiated light, light having an incident angle θ to the light emitting surface 11a smaller than the critical angle θa among the second radiated light is second transmitted light, and light having an incident angle θ to the light emitting surface 11b greater than the critical angle θa among the second radiated light is second totally reflected light, the position of the light receiving sensor 51a on the light emitting surface 11b of the glass substrate 11 is defined as a region on which (i) the first transmitted light among the first radiated light is incident and on which (ii) only the second totally reflected light among the second radiated light is incident.

Similarly, the position of the light receiving sensor 51b on the light emitting surface 11b of the glass substrate 11 is defined as a region on which (i) the second transmitted light among the second radiated light is incident and on which (ii) only the first totally reflected light among the first radiated light is incident.

In the above, description is provided of an example of a structure in which an air layer is present between the light emitting surface 11b of the glass substrate 11 and the light receiving surfaces 52a, 52b of the light receiving sensors 51a, 51b. In a structure in which the light emitting surface 11b of the glass substrate 11 is in direct contact with the light receiving surface 52a of the light receiving sensor 51a and the light receiving surface 52b of the light receiving sensor 51b without an air layer provided therebetween, the critical angle θa above is substituted by a critical angle determined by the glass substrate 11 (medium A) and the light receiving surfaces 52a and 52b (medium B).

As long as light mixture described above does not affect image quality, the light receiving sensors 51a and 51b may be arranged in positions where light radiated from the light emitting elements 31b of the light emitting element array 30b is partially incident on the light receiving sensor 51a and light radiated from the light emitting elements 31a of the light emitting element array 30a is partially incident on the light receiving sensor 51b, irrespective of the critical angle. In such a structure, the gap between the light receiving sensors 51a and 51b in the sub scanning direction may be smaller than the gap in FIG. 10A.

An example of a structure in which the light emitting element arrays are in one-to-one correspondence to the light receiving sensors is described in the previously-described embociments. In one or more embodiments, a plurality of light emitting element arrays correspond to one light receiving sensor.

Figure 11A:
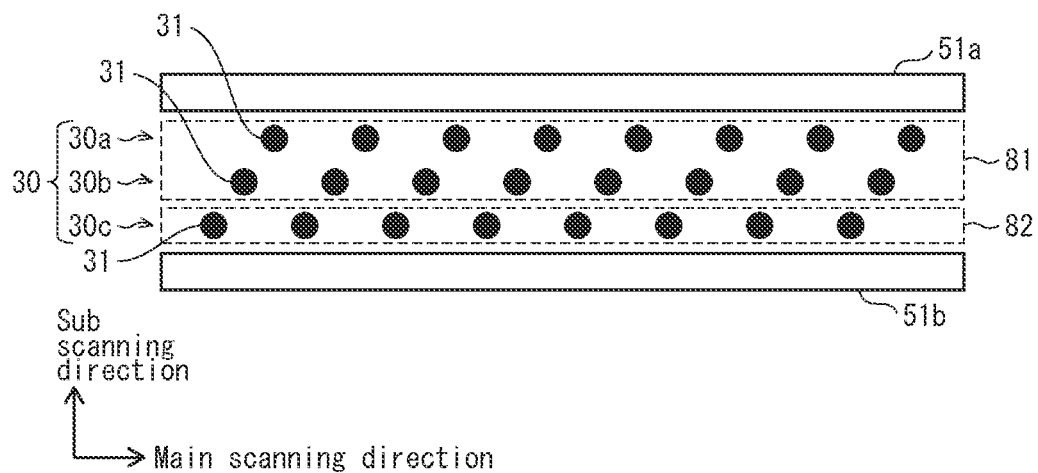
FIG. 11A is a schematic plan diagram of a relationship between a light emitting element group and two light receiving sensors according to one or more embodiments.

FIG. 11A is a schematic plan diagram of a relationship between a light emitting element group 30 and two light receiving sensors 51a and 51b according to one or more embodiments, and illustrates only the light emitting element group 30 and the light receiving sensors 51a and 51b.

The light emitting element group 30 includes 24 light emitting elements 31. Specifically, the light emitting element group 30 includes light emitting element arrays 30a, 30b, and 30c that are arranged in this order at intervals in the sub scanning direction, and the light emitting element arrays 30a, 30b, and 30c each include eight light emitting elements 31 arrayed in the main scanning direction. The 24 light emitting elements 31 are divided into a subgroup 81 including sixteen light emitting elements 31 of the light emitting element arrays 30a and 30b and a subgroup 82 including eight light emitting elements 31 of the light emitting element array 30c.

The sixteen light emitting elements 31 of the subgroup 81 correspond to the light receiving sensor 51a, and the eight light emitting elements 31 of the subgroup 82 correspond to the light receiving sensor 51b. That is, positions of the light receiving sensors 51a and 51b relative to the light emitting element arrays 30a through 30c are determined considering the critical angle θa such that only light radiated from the sixteen light emitting elements 31 of the subgroup 81 is incident on the light receiving sensor 51a and only light radiated from the eight light emitting elements 31 of the subgroup 82 is incident on the light receiving sensor 51b.

In FIG. 11A, when the number of the light emitting elements 31 in the subgroup 81 (namely sixteen) differs from the number of the light emitting elements 31 in the subgroup 82 (namely eight), a time length Ta1 required for light amount correction processing for the sixteen light emitting elements 31 of the subgroup 81 is 16×T seconds and a time length Ta2 required for light amount correction processing for the eight light emitting elements 31 of the subgroup 82 is 8×T seconds. The time length Ta1 is longer than the time length Ta2, and therefore, when the light amount correction processing for the subgroup 81 and the light amount correction processing for the subgroup 82 are performed in parallel, the light amount correction processing for the subgroup 82 ends earlier than the light amount correction processing for the subgroup 81. As a result, the time length Ta required for light amount correction processing for all the light emitting elements 31 is 16×T seconds.

Figure 11B:
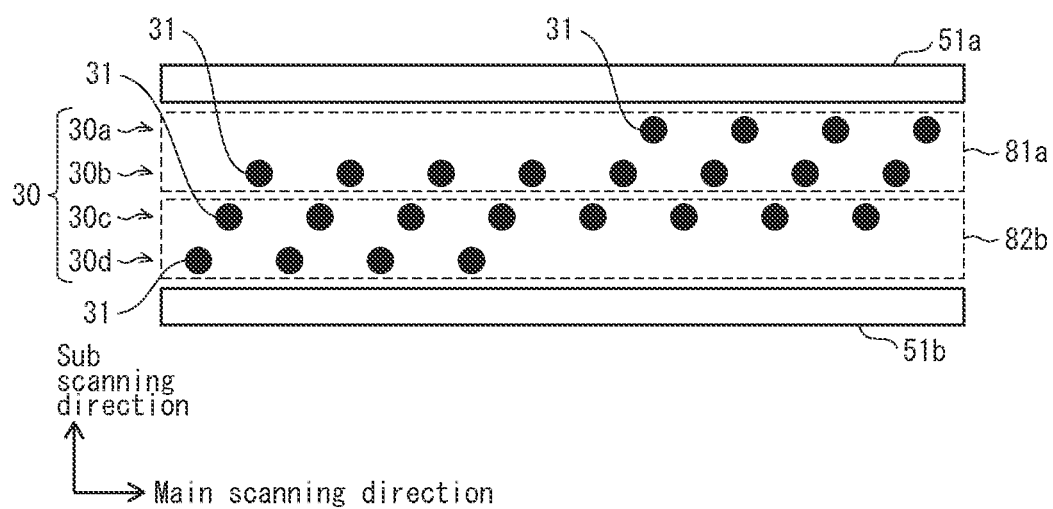
FIG. 11B is a diagram for explaining an example of a structure in which 24 light emitting elements of a light emitting element group are divided into two subgroups.

FIG. 11B is a diagram for describing an example of a structure in which, among 24 light emitting elements 31 of a light emitting element group 30, twelve light emitting elements 31 belong to a subgroup 81a corresponding to the light receiving sensor 51a and the other twelve light emitting elements 31 belong to a subgroup 82a corresponding to the light receiving sensor 51b.

In FIG. 11B, the subgroup 81a includes a light emitting element array 30a in which four light emitting elements 31 are arrayed in the main scanning direction and a light emitting element array 30b in which eight light emitting elements 31 are arrayed in the main scanning direction. The subgroup 82a includes a light emitting element array 30c in which eight light emitting elements 31 are arrayed in the main scanning direction and a light emitting element array 30d in which four light emitting elements 31 are arrayed in the main scanning direction. The light emitting element arrays 30a, 30b, 30c, and 30d are arranged in this order at intervals in the sub scanning direction.

In FIG. 11B, the subgroup 81a and the subgroup 82a include the same number of the light emitting elements 31 (twelve in this case). Accordingly, the time length Ta required for the light amount correction processing for all the light emitting elements 31 is 12×T seconds, and therefore the time length Ta is shortened to a greater extent than in cases where the two subgroups include the light emitting elements 31 of different numbers (e.g. 16×T seconds in the above example).

An example of a structure in which the light emitting element arrays are in one-to-one correspondence to the light receiving sensors is described in the previously-described embociments. In one or more embodiments, one light receiving sensor is shared by a light emitting element array of one light emitting element group and a light emitting element array of another light emitting element group.

Figure 12:
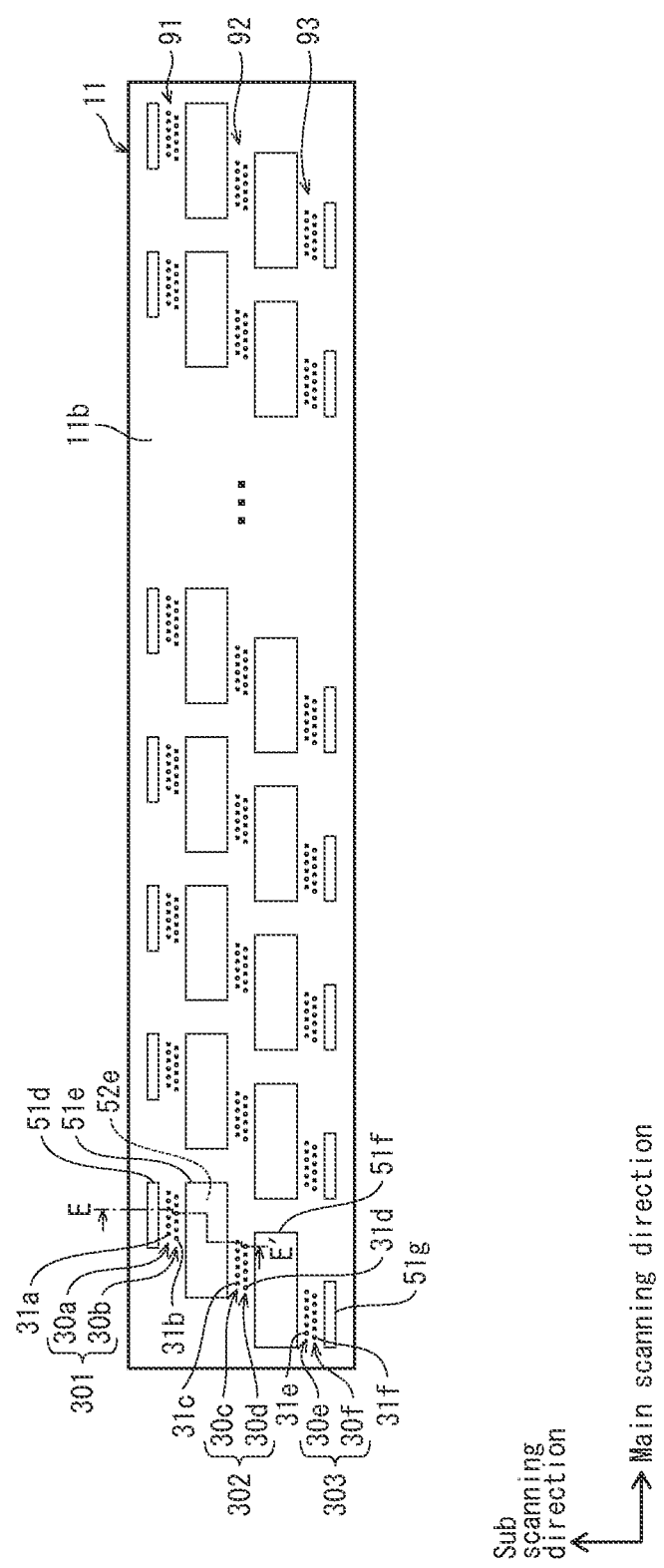
FIG. 12 is a schematic plan diagram of a relationship between light emitting element groups and light receiving sensors according to one or more embodiments.

FIG. 12 is a schematic plan diagram of the relationship between light emitting element groups and light receiving sensors according to one or more embodiments, and illustrates only the light emitting element groups and the light receiving sensors.

In FIG. 12, three light emitting element groups 301, 302, and 303 are arranged in this order at intervals in the sub scanning direction, and the light emitting element groups 301, 302, and 303 each include two light emitting element arrays.

A light receiving sensor 51d is provided in correspondence to the light emitting elements 31a of the light emitting element array 30a that is more distant from the light emitting element group 302 in the scanning direction among the two light emitting element arrays 30a and 30b of the light emitting element group 301. A light receiving sensor 51e is provided in correspondence to the light emitting elements 31b of the light emitting element array 30b that is closer to the light emitting element group 302.

The light receiving sensor 51e has a light receiving surface 52e of an area much greater than the light receiving sensor 51d; for example, the light receiving surface 52e is twice as long as the light receiving surface of the light receiving sensor 51d in the main scanning direction and the sub scanning direction. The light receiving sensor 51e is also the light receiving sensor for the light emitting elements 31c of, among the light emitting element arrays 30c and 30d of the light emitting element group 302 that is adjacent to the light emitting element group 301 in the sub scanning direction, the light emitting element array 30c that is closer to the light emitting element group 301 in the sub scanning direction. That is, the light receiving sensor 51e is an integrated light receiving sensor formed through integrating the light receiving sensor for the light emitting array 30b and the light receiving sensor for the light emitting array 30c.

Figure 13:
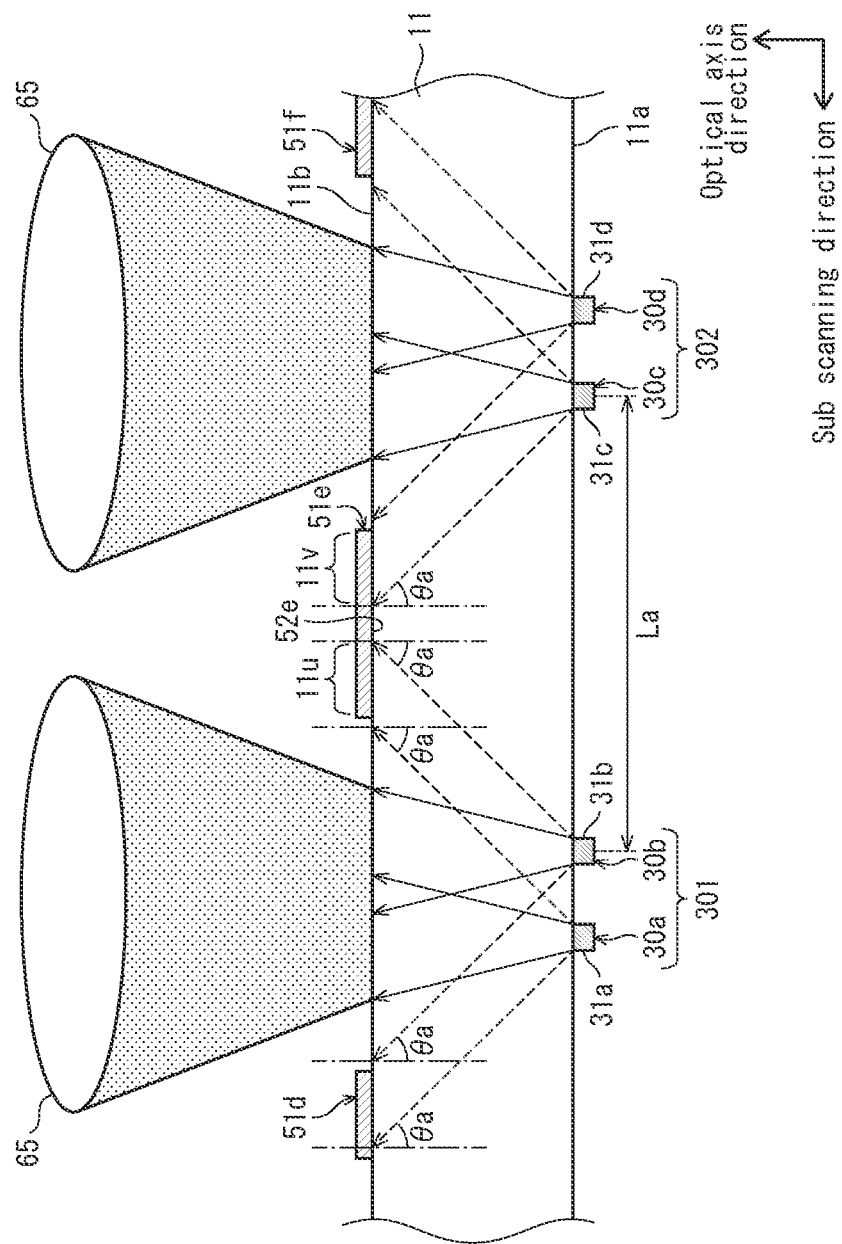
FIG. 13 is a schematic cross-sectional diagram taken along line E-E' in FIG. 12.

FIG. 13 is a schematic cross-sectional diagram taken along line E-E' in FIG. 12, illustrating how the light receiving sensor 51e is shared by the light emitting elements 31b of the light emitting element array 30b of the light emitting element group 301 and the light emitting elements 31c of the light emitting element array 30c of the light emitting element group 302.

That is, the light receiving sensor 51e is disposed in a region on the light emitting surface 11b of the substrate 11 that satisfies the following conditions (a) and (b).

(a) For each of the light emitting elements 31a and 31d of the light emitting element arrays 30a and 30d, of light radiated from the light emitting element and transmitted through the substrate 11, only light having an incident angle θ to the light emitting surface 11b greater than the critical angle θa is incident on the region.

Due to this, all the light radiated from the light emitting elements 31a and 31d and progressing toward the light receiving surface 52e is totally reflected. Thus, no light radiated from the light emitting elements 31a or 31d is incident on the light receiving surface 52e.

(b) For each of the light emitting elements 31b and 31c of the light emitting element arrays 30b and 30c, of light radiated from the light emitting element and transmitted through the substrate 11, light having an incident angle θ to the light emitting surface 11b smaller than the critical angle θa is incident on the region. Due to this, portions of light radiated from the light emitting elements 31b and portions of light radiated from the light emitting elements 31c are incident on the light receiving surface 52e, and therefore the light amounts incident thereon can be detected.

When the light receiving sensor 51e is shared by the light emitting element arrays 30b and 30c, during the light amount correction processing, all the light emitting elements 31b and 31c of the light emitting element arrays 30b and 30c are controlled to sequentially emit light one by one, and for each of the light emitting elements 31b and 31c, a corresponding correction coefficient Cn is set.

In the above, description is provided of one light emitting element array 30c of the light emitting element group 302. Light radiated from the light emitting elements 31d of the other light emitting element array 30d is detected by a light receiving sensor 51f.

The light receiving sensor 51f is used not only for the light emitting element array 30d but also as a light receiving sensor corresponding to the light emitting elements 31e of one light emitting element array 30e of the light emitting element group 303 in FIG. 12. For the light emitting elements 31f of the other light emitting element array 30f, a light receiving sensor 51g is provided.

As described above, two light emitting element groups (e.g. 301 and 302) that are adjacent in the sub scanning direction each include two light emitting element arrays (e.g. 30a and 30b for the light emitting element group 301, and 30c and 30d for the light emitting element group 302), and one light receiving sensor (e.g. 51e) disposed between the two light emitting element groups is used for light emitting element arrays (e.g. 30b and 30c) that are closer to the light receiving sensor among the four light emitting element arrays. Due to this, the number of the light receiving sensors is smaller than a structure in which the light receiving sensors are provided in one-to-one correspondence to the light emitting element arrays, and such a structure helps to achieve reduction of cost in accordance with reduction of the number of the light receiving sensors.

In the above, description is provided of a structure in which, as in FIG. 13, the light receiving sensor 51e is shared by the light emitting element array 30b of the light emitting element group 301 and the light emitting element array 30c of the light emitting element group 302, which is adjacent to the light emitting element array 30b in the sub scanning direction, and the light receiving surface 52e of the light receiving sensor 51e is longer in the sub scanning direction. Further, the light receiving surface 52e has two distinct regions 11u and 11v, where the region u is a region at one end of the light receiving sensor 51e in the sub scanning direction that receives light radiated from the light emitting elements 31b of the light emitting element array 30b and the region 11v is a region at the other end of the light receiving sensor 51e in the sub scanning direction that receives light radiated from the light emitting elements 31c of the light emitting element array 30c. However, the present invention is not limited to the embodiments.

For example, FIG. 14 shows a structure, as a modification, in which the light emitting element groups 301 and 302 are adjacent to each other in the sub scanning direction and a gap Lb between the light emitting element groups 301 and 302 in the sub scanning direction is shorter than a gap La in FIG. 13. When there is a region 11z on the light emitting surface 11b of the glass substrate 11 onto which light having an incident angle $\theta$ smaller than the critical angle $\theta$a of light radiated from the light emitting elements 31b is incident and light having an incident angle $\theta$ smaller than the critical angle $\theta$a of light radiated from the light emitting elements 31c is incident, the light receiving sensor 51e may be disposed in the region 11z such that the light receiving surface 52e faces the region 11z. The region 11z is a region on the light receiving surface 52e on which a first region and a second region overlaps in the sub scanning direction, where light incident on the light receiving surface 52e of light radiated from the light emitting elements 31b is incident on the first region and light incident on the light receiving surface 52e of light radiated from the light emitting elements 31c is incident on the second region.

In such an overlapping structure, the light receiving surface 52e of the light receiving sensor 51e only needs to have a length in the sub scanning direction corresponding to the region 11z. Accordingly, the light receiving surface 52e of the light receiving sensor 51e can be made smaller and consequently the size of the light receiving sensor 51e can be made smaller than in the structure in FIG. 13 in which no overlap of light occurs. Such a structure is beneficial in terms of costs.

In the previously-described embodiments, as in FIG. 13, the light receiving sensor 51e is shared by the light emitting element array 30b of the light emitting element group 301 and the light emitting element array 30c of the light emitting element group 302, and the light receiving surface 52e of the light receiving sensor 51e is directly disposed on the light emitting surface 11b of the glass substrate 11.

In contrast, in one or more embodiments, a light transmissive member (such as a transparent resin film) is disposed between the light emitting surface 11b of the glass substrate 11 and the light receiving surface 52e of the light receiving sensor 51e such that the critical angle is greater than $\theta$a described above, thereby achieving downsizing of the light receiving sensor 51e.

Figure 15A:
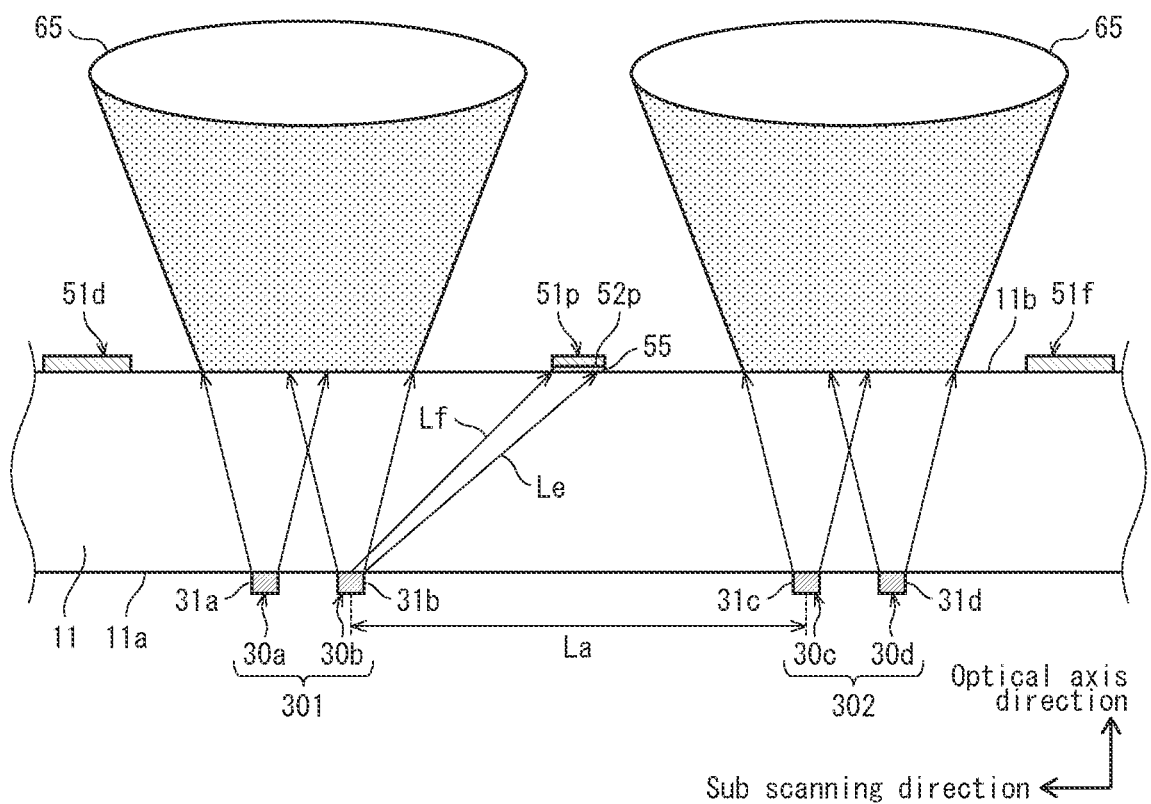
FIG. 15A is a diagram of an example of a structure in which a light transmissive member according to one or more embodiments is disposed between the light emitting surface of the glass substrate and a light receiving surface of the light receiving sensor.

FIG. 15A is a diagram of an example of a structure in which a light transmissive member 55 according to one or more embodiments is disposed between the light emitting surface 11b of the glass substrate 11 and the light receiving surface 52p of the light receiving sensor 51p.

The light transmissive member 55 is in direct contact with the light emitting surface 11b of the glass substrate 11 without an air layer provided therebetween. The light transmissive member 55 has smaller thickness than the light receiving sensor 51p; for example, when the light receiving sensor 51p that is a photodiode has thickness of 0.15 mm, the light transmissive member 55 has thickness in a range from 0.05 mm to 0.1 mm.

A light transmissive member 55 made of light transmissive material is sufficient, and the light transmissive member beneficially is as thin as possible, such that the refraction index of the air is n1, the refraction index of the glass substrate 11 is n2, the refraction index of the light transmissive member 55 is n3, and material that satisfies n1<n3<n2 is used. Due to this, a critical angle $\theta$p of light from the glass substrate 11 (medium B) relative to the light transmissive member 55 (medium C) is greater than the critical angle $\theta$a of light from the glass substrate 11 (medium B) relative to the space (medium A: refraction index=1).

Figure 15B:
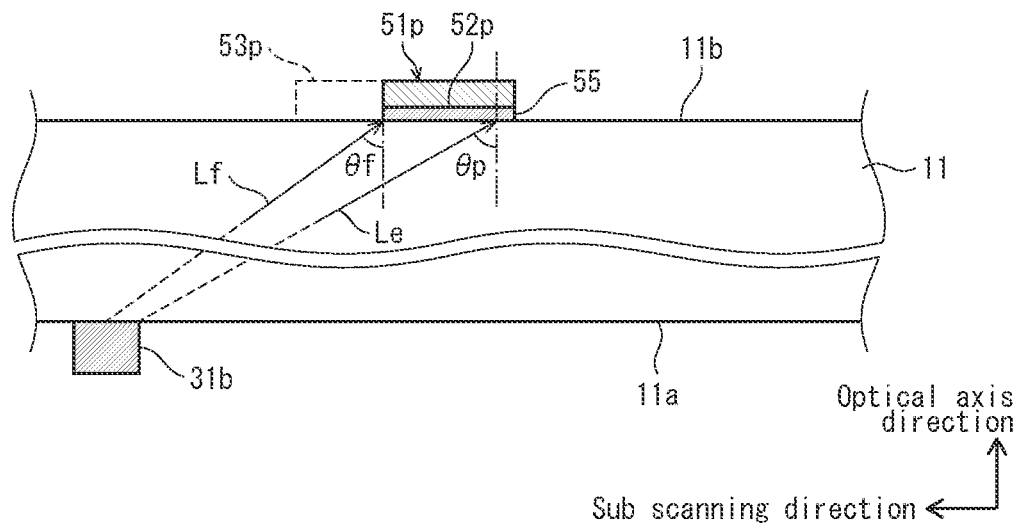
FIG. 15B is an enlarged diagram of the light transmissive member.

When the critical angle $\theta$p is greater than the critical angle $\theta$a, as in the enlarged diagram of FIG. 15B, of light radiated from the light emitting elements 31b, light Lf having an incident angle $\theta$f to the light emitting surface 11b smaller than the critical angle $\theta$p and is greater than the critical angle $\theta$a is not reflected at the light emitting surface 11b (boundary surface between the glass substrate 11 and the light transmissive member 55) and is received by the light receiving surface 52p of the light receiving sensor 51p through the light transmissive member 55.

In contrast, in a structure in which no light transmissive member 55 is disposed, the light Lf having an incident angle $\theta$f to the light emitting surface 11b greater than the critical angle $\theta$a is totally reflected at the light emitting surface 11b. Accordingly, the light receiving surface 52p of the light receiving sensor 51p needs to be enlarged up to a region where light having an incident angle $\theta$ smaller than the critical angle $\theta$a is received (specifically, the region illustrated by the broken line 53p).

That is, by providing the light transmissive member 55, the critical angle $\theta$p is increased. Consequently, in accordance with the increase of the critical angle $\theta$p, the length of the light receiving surface 52p of the light receiving sensor 51p in the sub scanning direction is shortened and the area of the light receiving surface 52p is decreased. As a result, the light receiving sensor 51p is downsized in accordance with the reduction of the area of the light receiving surface 52p.

In one or more embodiments, benefits of low costs due to downsizing of the light receiving sensor 51p are enjoyed particularly in a substrate structure in which the gap La in the sub scanning direction between the light emitting element arrays 30b and 30c that are adjacent in the sub scanning direction cannot be made small as the gap Lb in FIG. 14. Instead of the resin film described above, the light transmissive member 55 may be a joining layer where the light emitting surface 11b of the glass substrate 11 and the light receiving surface 52p of the light receiving sensor 51p are joined through the joining layer made of adhesive.

Figure 16:
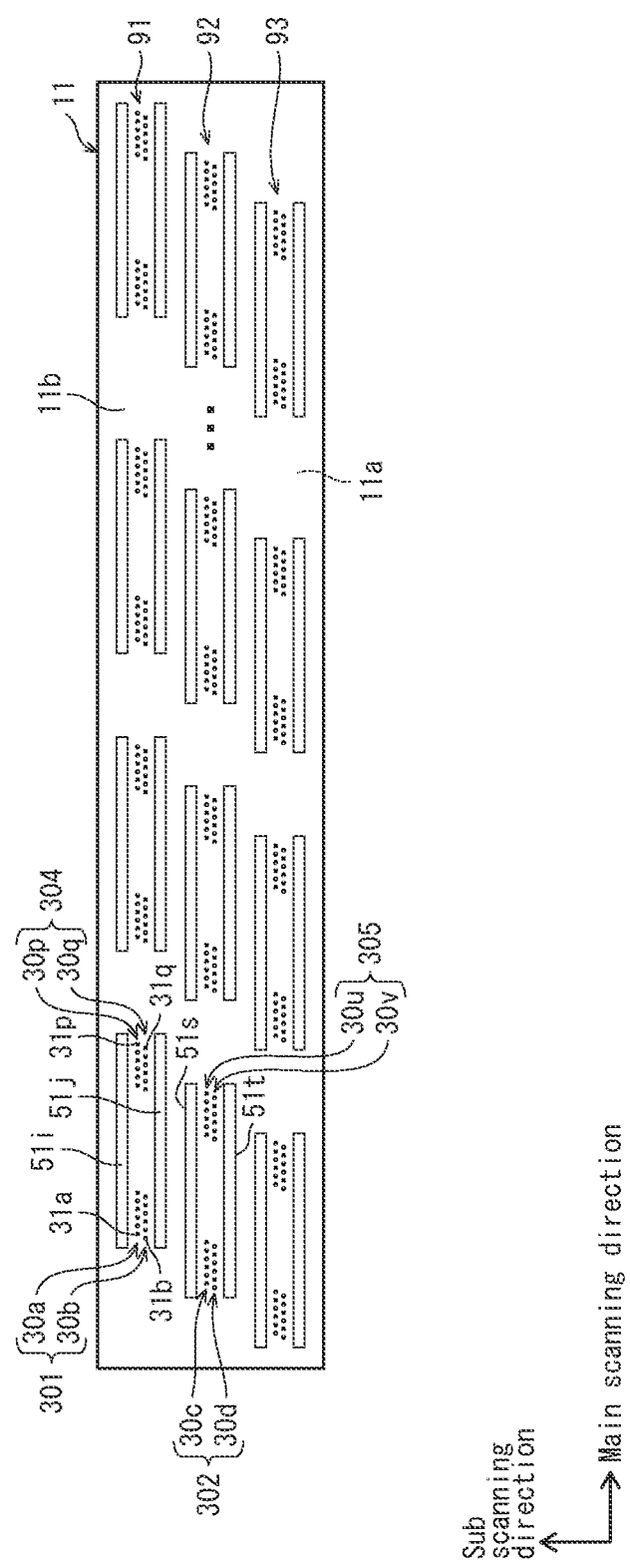
FIG. 16 is a plan diagram of an example of arrangement of light emitting element groups and light receiving sensors according to one or more embodiments.

In one or more embodiments, the light emitting element group 301 and a light emitting element group 304 that are adjacent in the main scanning direction form a light emitting element group pair as in the plan diagram of FIG. 16. Further, a light receiving sensor 51*i* elongated in the main scanning direction is disposed at one side of the light emitting element group pair in the sub scanning direction, and another light receiving sensor 51*j* elongated in the main scanning direction is disposed at the other side of the light emitting element group pair in the sub scanning direction.

The light receiving sensor 51*i* corresponds to the light emitting element array 30*a* and a light emitting element array 30*p*, where the light emitting element array 30*a* is closer to the light receiving sensor 51*i* among the light emitting element arrays 30*a* and 30*b* of the light emitting element group 301 and the light emitting element array 30*p* is closer to the light receiving sensor 51*i* among light emitting element arrays 30*p* and 30*q* of the light emitting element group 304.

The light receiving sensor 51*j* corresponds to the light emitting element array 30*b* and the light emitting element array 30*q*, where the light emitting element array 30*b* is closer to the light receiving sensor 51*j* among the light emitting element arrays 30*a* and 30*b* and the light emitting element array 30*q* is closer to the light receiving sensor 51*j* among the light emitting element arrays 30*p* and 30*q*.

The structure in FIG. 16 is substantially the same as the structure in which, in the structure in FIG. 9, the light receiving sensor 51*a* corresponding to one of the light emitting element groups 30 among two light emitting element groups 30 that are adjacent in the main scanning direction is integrated with the light receiving sensor 51*a* corresponding to the other of the light emitting element groups 30 (one functioning also as the other), and the light receiving sensor 51*b* corresponding to the one of the light emitting element groups 30 is integrated with the light receiving sensor 51*b* corresponding to the other of the light emitting element groups 30 (one functioning also as the other).

Due to this, the light emitting element arrays 30*a* and 30*p* share one light receiving sensor 51*i*, and the light emitting element arrays 30*b* and 30*q* share another light receiving sensor 51*j*. In other words, the light receiving sensor 51*i* corresponding to the light emitting element array 30*a* functions also as the light receiving sensor corresponding to the light emitting element array 30*p*, and the light receiving sensor 51*j* corresponding to the light emitting element array 30*b* functions also as the light receiving sensor corresponding to the light emitting element array 30*q*.

When performing the light amount correction processing, the light emitting elements 31*a* of the light emitting element array 30*a* and the light emitting elements 31*p* of the light emitting element array 30*p* are sequentially caused to emit light one by one, and for each of the light emitting elements 31*a* and 31*p* of the light emitting element arrays 30*a* and 30*p*, a light amount from the light emitting element is detected by the shared light receiving sensor 51*i* and thereby a correction coefficient Cn for the light emitting element is set and updated.

Similarly for the light emitting element arrays 30*b* and 30*q*, the light emitting elements 31*b* and 31*q* are sequentially caused to emit light one by one, and for each of the light emitting elements 31*b* and 31*q*, a light amount from the light emitting element is detected by the shared light receiving sensor 51*j* and thereby a correction coefficient Cn for the light emitting element is set and updated. Light amount correction for the light emitting elements 31*a* and 31*p* with use of the light receiving sensor 51*i* is performed in parallel with light amount correction for light emitting elements 31*b* and 31*q* with use of the light receiving sensor 51*j*.

The above applies to other light emitting element groups, e.g. a pair formed by the light emitting element groups 302 and 305. That is, the light receiving sensors 51*s* and 51*t* are arranged with the pair of the light emitting element group 302 and a light emitting element group 305 therebetween. The light emitting element array 30*c* of the light emitting element group 302 and a light emitting element array 30*u* of the light emitting element group 305 correspond to the light receiving sensor 51*s*, and the light emitting element array 30*d* of the light emitting element group 302 and a light emitting element array 30*v* of the light emitting element group 305 correspond to the light receiving sensor 51*t*. Light amount correction for the light emitting elements 31*c* and 31*u* with use of the light receiving sensor 51*s* is performed in parallel with light amount correction for the light emitting elements 31*d* and 31*v* with use of the light receiving sensor 51*t*. A structure in which light amount correction by the light receiving sensors 51*i*, 51*j*, 51*s*, and 51*t* is performed in parallel is beneficial. This applies to other light emitting element groups.

As described above, two light emitting element groups (e.g. 301 and 304) that are adjacent in the main scanning direction form a light emitting element group pair and light receiving sensors (e.g. 51*i* and 51*j*) are respectively disposed at the two sides of the light emitting element group pair in the sub scanning direction. Among two light emitting element arrays (e.g. 30*a* and 30*b*) of one of the light emitting element groups and two light emitting element arrays (e.g. 30*p* and 30*q*) of the other of the light emitting element groups, a first light emitting element array and a second light emitting element array (e.g. 30*a* and 30*p*) that are adjacent in the main scanning direction share one light receiving sensor (e.g. 51*i*) and a third light emitting element array and a fourth light emitting element array (e.g. 30*b* and 30*p*) that are adjacent in the main scanning direction share the other light receiving sensor (e.g. 51*j*).

That is, two light emitting element arrays in the above-described embodiments are in correspondence to one light receiving sensor. In such a structure, a total number of the light receiving sensors are smaller than in a structure in which the light emitting element arrays are in one-to-one correspondence to the light receiving sensors, and the cost is decreased in accordance with reduction of the number of the light receiving sensors.

<Modifications>

Although description of the present invention has been provided with reference to one or more embodiments, the present invention should not be construed as being limited to the above-described embodiments, and for example the following modifications, which are for illustration purposes only, are possible.

(1) In the above-described embodiments, description is provided of structures in which OLEDs are used for the light emitting elements 31. However, the present invention should not be construed as being limited to this, and is applicable to a structure in which, for example, laser diodes or the like are used. Further, description is provided of examples of structures in which the telecentric optical system is used for the optical system. However, the present invention should not be construed as being limited to this, and is applicable to a structure in which a lens array that includes lenses corresponding one-to-one to the light emitting element groups 30 is used.

(2) In the above-described embodiments, examples in which the image forming device is a tandem-type color printer are described. However, the present invention of course should not be construed as being limited to this, and is applicable to a color printer device of a type other than a tandem type or a monochrome printer. Further, the present invention achieves similar effects when applied to single-function peripherals such as copiers including a scanner device, facsimile devices having a facsimile communication function, and multi-function peripherals (MFPs) including all such functions. Further, the present invention should not be construed as being limited to image forming devices, and is applicable to any device that performs optical writing onto a photoreceptor such as a photoreceptor drum or a photoreceptor belt with use of a light beam from an optical printing head including light emitting elements such as organic EL elements.

Further, description is provided of examples of structures of the light emitting unit 90 including light emitting element arrays that are arranged at intervals in the sub scanning direction as the second direction and that each include light emitting elements 31 linearly arranged in the main scanning direction as the first direction. However, arrangement of the light emitting elements should not be construed as being limited to this.

For example, a structure of a light emitting unit 90 including, instead of the three element group arrays 91, 92, and 93 as in FIG. 3, only one element group array (e.g. the element group array 91) is possible. In such a structure, the organic light emitting elements 31 are arranged at a defined pitch in a staggered pattern in the main scanning direction. Also in such a structure, sets of a light detection unit 51 and a microlens 65 are provided in one-to-one correspondence to the light emitting element groups 30.

Further, instead of structures in which the light emitting element groups 30 each include a plurality of light emitting element arrays (e.g. 30*a* and 30*b*), a structure in which one light emitting element array (group) including light emitting elements 31 arranged in a line in the main scanning direction forms one light emitting element group 30 is possible. Also in this structure, sets of a light detection unit 51 and a microlens 65 are provided in one-to-one correspondence to the light emitting element groups 30. Further, description is provided of examples in which the first direction is the main scanning direction and the second direction is the sub scanning direction. However, the present invention should not be construed as being limited to this, and any two directions that are orthogonal to each other may be the first direction and the second direction.

Further, dimensions, shapes, and materials of components such as the light source substrate, the light receiving sensors, and the lens array, the number of the light emitting elements, and the like are not limited to the examples described above, and appropriate dimensions, shapes, materials, numbers, and the like are determined in accordance with device structures.

Further, any possible combinations of the above-described embodiments and the modifications are construed as being included in the scope of the present invention.

<Synopsis>

The above-described embodiments and modifications represent the present invention are summarized as described below.

That is, an optical print head reflecting one or more embodiments of the present invention is an optical print head performing optical writing to a photoreceptor, the optical print head including: a light transmissive substrate; a light emitting unit including light emitting element groups each including two or more light emitting elements disposed on a first main surface of the substrate; a lens array including lenses corresponding one-to-one to the light emitting element groups, the lenses each guiding, to the photoreceptor, a portion of light radiated from each of the light emitting elements of a corresponding one of the light emitting element groups, incident on the first main surface, transmitted through the substrate, and emitted from a second main surface of the substrate; light detection units disposed above the second main surface of the substrate in one-to-one correspondence to the light emitting element groups; and a correction unit performing a correction for each of the light emitting element groups. In the correction, light from each of the light emitting elements of the light emitting element group is detected by a corresponding one of the light detection units, and light amounts of the light emitting elements of the light emitting element group are corrected based on the detected light.

According to one or more embodiments of the optical print head, the light detection units each include a first light receiving sensor and a second light receiving sensor, for each of the light emitting element groups, the light emitting elements therein each belong to one of a first subgroup and a second subgroup, the light emitting elements of the first subgroup are arranged along a first direction, the light emitting elements of the second subgroup are arranged parallel to the first subgroup, and the first subgroup and the second subgroup are adjacent to each other in a second direction orthogonal to the first direction, the first light receiving sensor is disposed in a region on the second main surface of the substrate on which transmitted light from the first subgroup is incident and on which only totally reflected light from the second subgroup is incident, and the second light receiving sensor is disposed in a region on the second main surface of the substrate on which transmitted light from the second subgroup is incident and on which only totally reflected light from the first subgroup is incident. Here, for each of the light emitting elements, of light radiated from the light emitting element and transmitted through the substrate, a portion of the light having an incident angle to the second main surface smaller than a critical angle is defined as transmitted light, and another portion of the light having an incident angle to the second main surface greater than the critical angle is defined as totally reflected light.

According to one or more embodiments of the optical print head, the first subgroup includes the same number of the light emitting elements as the second subgroup.

According to one or more embodiments of the optical print head, among the light emitting element groups, a first light emitting element group and a second light emitting element group are adjacent to each other in the second direction, among the light detection units, a first light detection unit corresponds to the first light emitting element group and a second light detection unit corresponds to the second light emitting element group, the first light receiving sensor of the first light detection unit is disposed at one side of the first light emitting element group in the second direction and the second light receiving sensor of the first light detection unit is disposed at the other side of the first light emitting element group in the second direction, and the first light receiving sensor of the second light detection unit is disposed at one side of the second light emitting element group in the second direction and the second light receiving sensor of the second light detection unit is disposed at the other side of the second light emitting element group in the second direction.

According to one or more embodiments of the optical print head, the second light receiving sensor of the first light detection unit and the first light receiving sensor of the second light detection unit are integrated as an integrated light receiving sensor, and the integrated light receiving sensor receives transmitted light from the second subgroup of the first light emitting element group and the first subgroup of the second light emitting element group.

According to at one or more embodiments of the optical print head, the first and the second light emitting element groups are spaced away from each other at a defined interval in the second direction such that a first region and a second region overlap on the light receiving surface of the integrated light receiving sensor, the first region being a region on which light from the second subgroup is incident, the second region being a region on which light from the third subgroup is incident.

The optical print head according to one or more embodiments further includes: a light transmissive member disposed between the second main surface of the substrate and the light receiving surface of the integrated light receiving sensor, where a refractive index of air is defined as n1, a refractive index of the substrate is defined as n2, a refractive index of the light transmissive member is defined as n3, and n1<n3<n2 is satisfied.

According to one or more embodiments of the optical print head, among the light emitting element groups, a first light emitting element group and a second light emitting element group are adjacent to each other in the first direction, among the light detection units, a first light detection unit corresponds to the first light emitting element group and a second light detection unit corresponds to the second light emitting element group, the first light receiving sensor of the first light detection unit is disposed at one side of the first light emitting element group in the second direction and the second light receiving sensor of the first light detection unit is disposed at the other side of the first light emitting element group in the second direction, and the first light receiving sensor of the second light detection unit is disposed at one side of the second light emitting element group in the second direction and the second light receiving sensor of the second light detection unit is disposed at the other side of the second light emitting element group in the second direction.

According to one or more embodiments of the optical print head, the first light receiving sensor of the first light detection unit and the first light receiving sensor of the second light detection unit are integrated as a first integrated light receiving sensor, and the second light receiving sensor of the first light detection unit and the second light receiving sensor of the second light detection unit are integrated as a second integrated light receiving sensor.

According to one or more embodiments of the optical print head, on the second main surface of the substrate, each of the light detection units is disposed in a region other than a region through which the portion of the light guided by a corresponding one of the lenses is transmitted.

An image forming device reflecting one or more embodiments of the present invention is an image forming device forming an image through performing optical writing with use of light from an optical print head, the optical print head including: a light transmissive substrate; a light emitting unit including light emitting element groups each including two or more light emitting elements disposed on a first main surface of the substrate; a lens array including lenses corresponding one-to-one to the light emitting element groups, the lenses each guiding, to the photoreceptor, a portion of light radiated from each of the light emitting elements of a corresponding one of the light emitting element groups, incident on the first main surface, transmitted through the substrate, and emitted from a second main surface of the substrate; light detection units disposed above the second main surface of the substrate in one-to-one correspondence to the light emitting element groups; and a correction unit performing a correction for each of the light emitting element groups. In the correction, light from each of the light emitting elements of the light emitting element group is detected by a corresponding one of the light detection units, and light amounts of the light emitting elements of the light emitting element group are corrected based on the detected light.

In a structure in which the light emitting element groups are in one-to-one correspondence to the light detection units as described above, a total time length required for light amount correction performed with use of a light detection unit can be made shorter than in a conventional structure in which one sensor is shared by light emitting element groups.

Although one or more embodiments of the present invention have been described and illustrated in detail, the disclosed embodiments are made for the purposes of illustration and example only and not limitation. The scope of the present invention should be interpreted by the terms of the appended claims.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical print head that performs optical writing to a photoreceptor, the optical print head comprising:
    a light transmissive substrate;
    a light emitting unit comprising light emitting element groups, each of which comprises two or more light emitting elements disposed on a first main surface of the substrate;
    a lens array comprising lenses that correspond one-to-one to the light emitting element groups, wherein each of the lenses guides light to the photoreceptor, and the light radiated from each of the light emitting elements is incident on the first main surface, transmitted through the substrate, and emitted from a second main surface of the substrate;
    light detection units disposed above the second main surface of the substrate in one-to-one correspondence to the light emitting element groups and that detects the light from each of the light emitting elements; and
    a correction unit that corrects light amounts of the light emitting elements of the light emitting element group based on detection of the light detection units, wherein
    the light emitting elements each belong to one of a first subgroup and a second subgroup,
    the light emitting elements of the first subgroup are arranged along a first direction,
    the light emitting elements of the second subgroup are arranged parallel to the first subgroup and adjacent to the first group in a second direction orthogonal to the first direction,
    the light detection units each comprise a first light receiving sensor and a second light receiving sensor,
    transmitted light from the first subgroup and totally-reflected light from the second subgroup is incident on the first light receiving sensor, transmitted light from the second subgroup and totally-reflected light from the first subgroup is incident on the second light receiving sensor, the transmitted light is a portion of the light having an incident angle to the second main surface smaller than a critical angle, the totally-reflected light is another portion of the light having an incident angle to the second main surface greater than the critical angle, among the light emitting element groups, a first light emitting element group and a second light emitting element group are adjacent to each other in the second direction, among the light detection units, a first light detection unit corresponds to the first light emitting element group and a second light detection unit corresponds to the second light emitting element group, the first light receiving sensor of the first light detection unit is disposed at one side of the first light emitting element group in the second direction and the second light receiving sensor of the first light detection unit is disposed at the other side of the first light emitting element group in the second direction, and the first light receiving sensor of the second light detection unit is disposed at one side of the second light emitting element group in the second direction and the second light receiving sensor of the second light detection unit is disposed at the other side of the second light emitting element group in the second direction.

2. The optical print head of claim 1, wherein the first subgroup includes a same number of the light emitting elements as the second subgroup.

3. The optical print head of claim 1, wherein the second light receiving sensor of the first light detection unit and the first light receiving sensor of the second light detection unit are integrated as an integrated light receiving sensor, and the integrated light receiving sensor receives transmitted light from the second subgroup of the first light emitting element group and the first subgroup of the second light emitting element group.

4. The optical print head of claim 3, wherein the first and the second light emitting element groups are spaced away from each other at a defined interval in the second direction such that a first region on which light from the second subgroup is incident and a second region on which light from the first subgroup is incident overlap on the light receiving surface of the integrated light receiving sensor.

5. The optical print head of claim 3, further comprising:
a light transmissive member disposed between the second main surface of the substrate and the light receiving surface of the integrated light receiving sensor, wherein n1<n3<n2 is satisfied, where a refractive index of air is n1, a refractive index of the substrate is n2, and a refractive index of the light transmissive member is n3.

6. The optical print head of claim 1, wherein
each of the light detection units is disposed in a region on the second main surface other than a region through which the light guided by a corresponding one of the lenses is transmitted.

7. An optical print head that performs optical writing to a photoreceptor, the optical print head comprising:
a light transmissive substrate;
a light emitting unit comprising light emitting element groups, each of which comprises two or more light emitting elements disposed on a first main surface of the substrate;
a lens array comprising lenses that correspond one-to-one to the light emitting element groups, wherein each of the lenses guides light to the photoreceptor, and the light radiated from each of the light emitting elements is incident on the first main surface, transmitted through the substrate, and emitted from a second main surface of the substrate;

light detection units disposed above the second main surface of the substrate in one-to-one correspondence to the light emitting element groups and that detects the light from each of the light emitting elements; and a correction unit that corrects light amounts of the light emitting elements of the light emitting element group based on detection of the light detection units, wherein the light emitting elements each belong to one of a first subgroup and a second subgroup, the light emitting elements of the first subgroup are arranged along a first direction, the light emitting elements of the second subgroup are arranged parallel to the first subgroup and adjacent to the first group in a second direction orthogonal to the first direction, the light detection units each comprise a first light receiving sensor and a second light receiving sensor, transmitted light from the first subgroup and totally-reflected light from the second subgroup is incident on the first light receiving sensor, transmitted light from the second subgroup and totally-reflected light from the first subgroup is incident on the second light receiving sensor, the transmitted light is a portion of the light having an incident angle to the second main surface smaller than a critical angle, the totally-reflected light is another portion of the light having an incident angle to the second main surface greater than the critical angle, among the light emitting element groups, a first light emitting element group and a second light emitting element group are adjacent to each other in the first direction, among the light detection units, a first light detection unit corresponds to the first light emitting element group and a second light detection unit corresponds to the second light emitting element group, the first light receiving sensor of the first light detection unit is disposed at one side of the first light emitting element group in the second direction and the second light receiving sensor of the first light detection unit is disposed at the other side of the first light emitting element group in the second direction, and the first light receiving sensor of the second light detection unit is disposed at one side of the second light emitting element group in the second direction and the second light receiving sensor of the second light detection unit is disposed at the other side of the second light emitting element group in the second direction.

8. The optical print head of claim 7, wherein
the first light receiving sensor of the first light detection unit and the first light receiving sensor of the second light detection unit are integrated as a first integrated light receiving sensor, and the second light receiving sensor of the first light detection unit and the second light receiving sensor of the second light detection unit are integrated as a second integrated light receiving sensor.

9. An image forming device that forms an image through performing optical writing with use of light from an optical print head, the optical print head comprising:
- a light transmissive substrate;
- a light emitting unit comprising light emitting element groups, each of which comprises two or more light emitting elements disposed on a first main surface of the substrate;
- a lens array comprising lenses that correspond one-to-one to the light emitting element groups, wherein each of the lenses guides light to the photoreceptor, and the light radiated from each of the light emitting elements is incident on the first main surface, transmitted through the substrate, and emitted from a second main surface of the substrate;
- light detection units disposed above the second main surface of the substrate in one-to-one correspondence to the light emitting element groups and that detects the light from each of the light emitting elements; and
- a correction unit that corrects light amounts of the light emitting elements of the light emitting element group based on detection of the light detection units, wherein
- the light emitting elements each belong to one of a first subgroup and a second subgroup,
- the light emitting elements of the first subgroup are arranged along a first direction,
- the light emitting elements of the second subgroup are arranged parallel to the first subgroup and adjacent to the first group in a second direction orthogonal to the first direction,
- the light detection units each comprise a first light receiving sensor and a second light receiving sensor,
- transmitted light from the first subgroup and totally-reflected light from the second subgroup is incident on the first light receiving sensor,
- transmitted light from the second subgroup and totally-reflected light from the first subgroup is incident on the second light receiving sensor,
- the transmitted light is a portion of the light having an incident angle to the second main surface smaller than a critical angle,
- the totally-reflected light is another portion of the light having an incident angle to the second main surface greater than the critical angle,
- among the light emitting element groups, a first light emitting element group and a second light emitting element group are adjacent to each other in the second direction,
- among the light detection units, a first light detection unit corresponds to the first light emitting element group and a second light detection unit corresponds to the second light emitting element group,
- the first light receiving sensor of the first light detection unit is disposed at one side of the first light emitting element group in the second direction and the second light receiving sensor of the first light detection unit is disposed at the other side of the first light emitting element group in the second direction, and
- the first light receiving sensor of the second light detection unit is disposed at one side of the second light emitting element group in the second direction and the second light receiving sensor of the second light detection unit is disposed at the other side of the second light emitting element group in the second direction.

10. An image forming device that forms an image through performing optical writing with use of light from an optical print head, the optical print head comprising:
- a light transmissive substrate;
- a light emitting unit comprising light emitting element groups, each of which comprises two or more light emitting elements disposed on a first main surface of the substrate;
- a lens array comprising lenses that correspond one-to-one to the light emitting element groups, wherein each of the lenses guides light to the photoreceptor, and the light radiated from each of the light emitting elements is incident on the first main surface, transmitted through the substrate, and emitted from a second main surface of the substrate;
- light detection units disposed above the second main surface of the substrate in one-to-one correspondence to the light emitting element groups and that detects the light from each of the light emitting elements; and
- a correction unit that corrects light amounts of the light emitting elements of the light emitting element group based on detection of the light detection units, wherein
- the light emitting elements each belong to one of a first subgroup and a second subgroup,
- the light emitting elements of the first subgroup are arranged along a first direction,
- the light emitting elements of the second subgroup are arranged parallel to the first subgroup and adjacent to the first group in a second direction orthogonal to the first direction,
- the light detection units each comprise a first light receiving sensor and a second light receiving sensor,
- transmitted light from the first subgroup and totally-reflected light from the second subgroup is incident on the first light receiving sensor,
- transmitted light from the second subgroup and totally-reflected light from the first subgroup is incident on the second light receiving sensor,
- the transmitted light is a portion of the light having an incident angle to the second main surface smaller than a critical angle,
- the totally-reflected light is another portion of the light having an incident angle to the second main surface greater than the critical angle,
- among the light emitting element groups, a first light emitting element group and a second light emitting element group are adjacent to each other in the second direction,
- among the light detection units, a first light detection unit corresponds to the first light emitting element group and a second light detection unit corresponds to the second light emitting element group,
- the first light receiving sensor of the first light detection unit is disposed at one side of the first light emitting element group in the second direction and the second light receiving sensor of the first light detection unit is disposed at the other side of the first light emitting element group in the second direction, and
- the first light receiving sensor of the second light detection unit is disposed at one side of the second light emitting element group in the second direction and the second light receiving sensor of the second light detection unit is disposed at the other side of the second light emitting element group in the second direction.

* * * * *